US012570793B2

(12) United States Patent
Joshi et al.

(10) Patent No.: US 12,570,793 B2
(45) **Date of Patent: *Mar. 10, 2026**

(54) PROCESS FOR FORMATION OF ADDITIVE-CONTAINING POLYESTER

(71) Applicant: OCTAL SAOC FZC, Muscat (OM)

(72) Inventors: Tarun Joshi, Salalah (OM); Muteeb Siddiqui, Salalah (OM); Klaus Haarmann, Salalah (OM); Jerry Bradnam, Salalah (OM); Sean Brown, Monclova, OH (US); Mohammed Razeem, Plano, TX (US); William J. Barenberg, Plano, TX (US); Nicholas P. Barakat, Muscat (OM)

(73) Assignee: OCTAL SAOC FZC, Muscat (OM)

(*) Notice: Subject to any disclaimer, the term of this patent is extended or adjusted under 35 U.S.C. 154(b) by 709 days.

This patent is subject to a terminal disclaimer.

(21) Appl. No.: 17/984,947

(22) Filed: Nov. 10, 2022

(65) Prior Publication Data

US 2023/0092075 A1 Mar. 23, 2023

Related U.S. Application Data

(63) Continuation-in-part of application No. 16/808,939, filed on Mar. 4, 2020, now Pat. No. 11,518,865.

(60) Provisional application No. 62/850,168, filed on May 20, 2019.

(51) Int. Cl.

| | |
|---|---|
| ***C08G 63/183*** | (2006.01) |
| ***C08G 63/78*** | (2006.01) |
| ***C08J 3/22*** | (2006.01) |
| ***C08J 11/14*** | (2006.01) |
| ***C08J 11/24*** | (2006.01) |
| ***C08J 11/26*** | (2006.01) |
| ***C08K 3/22*** | (2006.01) |
| ***C08K 3/26*** | (2006.01) |
| ***C08K 3/30*** | (2006.01) |
| ***C08K 3/34*** | (2006.01) |

(52) U.S. Cl.

CPC ......... *C08G 63/183* (2013.01); *C08G 63/785* (2013.01); *C08J 3/22* (2013.01); *C08J 11/14* (2013.01); *C08J 11/24* (2013.01); *C08J 11/26* (2013.01); *C08K 3/22* (2013.01); *C08K 3/26* (2013.01); *C08K 3/30* (2013.01); *C08K 3/34* (2013.01); *C08J 2367/02* (2013.01); *C08K 2003/2227* (2013.01); *C08K 2003/265* (2013.01); *C08K 2003/3045* (2013.01)

(58) Field of Classification Search

USPC ........................................................... 521/48

See application file for complete search history.

(56) References Cited

U.S. PATENT DOCUMENTS

| | | | | |
|---|---|---|---|---|
| 2,933,476 | A | 4/1960 | Fisher | |
| 3,952,053 | A | 4/1976 | Brown, Jr. et al. | |
| 5,037,897 | A | 8/1991 | Glans et al. | |
| 5,559,159 | A | 9/1996 | Sublett et al. | |
| 5,559,169 | A † | 9/1996 | Sublett | |
| 5,945,460 | A | 8/1999 | Ekart et al. | |
| 6,191,177 | B1 | 2/2001 | Ekart et al. | |
| 7,135,503 | B1 | 11/2006 | Maurer et al. | |
| 7,807,728 | B2 | 10/2010 | Yokoyama et al. | |
| 7,931,842 | B2 | 4/2011 | Barakat et al. | |
| 8,545,205 | B2 | 10/2013 | Barakat | |
| 8,642,145 | B2 | 2/2014 | Bower et al. | |
| 8,986,587 | B2 | 3/2015 | Barakat | |
| 9,011,737 | B2 | 4/2015 | Barakat et al. | |
| 9,903,057 | B2 | 2/2018 | Hayashi et al. | |
| 10,544,276 | B2 * | 1/2020 | Charra | C07C 67/56 |
| 11,161,960 | B2 | 11/2021 | Joshi et al. | |
| 11,518,865 | B2 | 12/2022 | Joshi et al. | |
| 2003/0134915 | A1 | 7/2003 | Scantlebury et al. | |
| 2005/0096482 | A1 | 5/2005 | Tamada et al. | |
| 2005/0182233 | A1 | 8/2005 | Weinhold et al. | |
| 2007/0066720 | A1 † | 3/2007 | Venett | |
| 2007/0299150 | A1 | 12/2007 | Nakao et al. | |
| 2008/0197120 | A1 | 8/2008 | Beck et al. | |
| 2010/0041913 | A1 | 2/2010 | Umaba et al. | |
| 2010/0168328 | A1 † | 7/2010 | Kannan | |
| 2012/0118741 | A1 | 5/2012 | Tucholski | |

(Continued)

FOREIGN PATENT DOCUMENTS

| | | | |
|---|---|---|---|
| CN | 1275995 | A | 12/2000 |
| CN | 104005133 | A | 8/2014 |

(Continued)

OTHER PUBLICATIONS

Office Action issued in corresponding Colombian Patent Application No. NC2022/0013733 on Aug. 6, 2024.
Office Action issued in corresponding El Salvador Patent Application No. 6360.2021 on Jun. 25, 2024.
Office Action issued in corresponding Malaysian Patent Application No. PI2022006704 on Sep. 25, 2024.
U.S. Office Action issued in corresponding U.S. Appl. No. 16/886,340 on Mar. 15, 2021.
U.S. Office Action issued in corresponding U.S. Appl. No. 17/112,928 on Mar. 11, 2021.
Indian Examination Report issued in corresponding Indian Patent Application No. 202117059137 on Aug. 16, 2022.

(Continued)

*Primary Examiner* — Terressa Boykin
(74) *Attorney, Agent, or Firm* — SQUIRE PATTON BOGGS (US) LLP

(57) ABSTRACT

A method for forming additive-containing reclaimed polyester can include: providing a feed of recycled polyester; providing a feed of polyester precursors; depolymerizing the recycled polyester to obtain depolymerized polyester monomers; polymerizing the depolymerized polyester monomers with the polyester precursors to form a reclaimed polyester; adding additives to the reclaimed properties to adjust for example, the color and/or viscosity, and providing the additive-containing reclaimed polyester as output.

19 Claims, 9 Drawing Sheets

(56) References Cited

U.S. PATENT DOCUMENTS

| | | | |
|---|---|---|---|
| 2012/0181715 A1 † | 7/2012 | Barakat | |
| 2012/0184788 A1 | 7/2012 | Loop et al. | |
| 2016/0130107 A1 | 5/2016 | Allen, Jr. et al. | |
| 2017/0204536 A1 † | 7/2017 | Brunner | |
| 2020/0399437 A1 | 12/2020 | Pawelski et al. | |

FOREIGN PATENT DOCUMENTS

| | | | | |
|---|---|---|---|---|
| CN | 106750206 A | 5/2017 | | |
| CN | 110511366 A | 11/2019 | | |
| CO | 4130220 A1 | 2/1995 | | |
| EP | 1 023 369 B1 † | 1/2002 | | |
| EP | 1 461 379 B1 † | 7/2013 | | |
| EP | 4194490 A1 * | 6/2023 | | C08J 11/24 |
| JP | 5-247191 A | 9/1993 | | |
| JP | 11-181073 | 7/1999 | | |
| JP | 11-181073 A † | 7/1999 | | |
| JP | 2002-514661 A | 5/2002 | | |
| JP | 2003-55300 A † | 2/2003 | | |
| JP | 2004-196880 A | 7/2004 | | |
| JP | 2008-045236 A | 2/2008 | | |
| JP | 2010-006962 A | 6/2008 | | |
| JP | 2009-057483 A | 3/2009 | | |
| JP | 2010-126660 A | 6/2010 | | |
| JP | 2012-514081 A | 6/2012 | | |
| KR | 2002-0018220 A | 3/2002 | | |
| KR | 10-0572027 B1 | 4/2006 | | |
| KR | 10-2011-0119627 A | 11/2011 | | |
| KR | 10-2012-0133037 A † | 12/2012 | | |
| KR | 101561528 B1 | 10/2015 | | |
| PT | 1461379 E | 10/2013 | | |
| WO | 1999/020684 A1 | 4/1999 | | |
| WO | 2006/068093 A1 | 6/2006 | | |
| WO | 2000/047658 A1 | 8/2008 | | |
| WO | 2014/072483 A1 | 5/2014 | | |
| WO | 2017/161463 A1 | 9/2017 | | |
| WO | 2019/162265 A1 | 8/2019 | | |
| WO | 2020/149798 A1 | 7/2020 | | |
| WO | 03/051970 A1 | 6/2023 | | |

OTHER PUBLICATIONS

Notice of Reasons for Refusal dated Jun. 2, 2022 issued for Japanese Patent Application No. 2021-569957, with English Translation, 10 pages.

Canadian Office Action issued in corresponding Canadian Patent Application No. 3,141,282 on Mar. 1, 2022.

Australian Office Action issued in corresponding Australian Patent Application No. 2020279908 on Dec. 13, 2021.

U.S. Office Action issued in corresponding U.S. Appl. No. 17/185,376 on Jun. 1, 2021.

International Search Report and Written Opinion issued in corresponding International Application No. PCT/IB20/54363 on Aug. 19, 2020.

Third Party Submission of Jul. 21, 2023 in corresponding European Patent Application No. 20808670.2-1107.

Decision of Refusal issued in corresponding Japanese Patent Application No. (JP 2022-528286-A) 2021-569957 on Apr. 18, 2023.

Chinese Office Action issued in corresponding Chinese Patent Application No. 202080052524.9 on Jun. 29, 2023.

Korean Office Action issued in corresponding Korean Patent Application No. 10-2021-7041493 on Feb. 28, 2023.

Colombian Office Action issued in corresponding Colombian Patent Application No. NC2021/0016486 on Jun. 22, 2023.

Korean Office Action issued in corresponding Korean Patent Application No. 10-2021-7041493 on Jun. 21, 2023.

Third Party Submission filed in corresponding Korean Patent Application No. 10-2021-7041493 on Jun. 19, 2023.

Indonesian Office Action issued in corresponding Indonesian Patent Application No. P00202313722 on Feb. 21, 2025.

Brazilian Grant Publication issued for BR 11 2021 023306-7 A2 on Nov. 22, 2022, p. 347 of 592, 2 pages.

Brazilian Written Opinion issued in corresponding Brazilian Patent Application No. 112021023306-7 on May 8, 2020, 6 pages.

Canadian Notice of Allowance issued in corresponding Canadian Patent Application No. 3,141,282 on Oct. 3, 2022, 1 page.

Chilean Office Action issued in corresponding Chilean Patent Application No. 202103066 on Nov. 19, 2021, 16 pages.

Chinese Office Action issued in corresponding Chinese Patent Application No. 202080052524.9 on Jul. 20, 2022, 20 pages.

Colombian Office Action issued in corresponding Colombian Patent Application No. NC2021/0016486 on Nov. 16, 2022, 14 pages.

European Patent Office Communication issued in corresponding European Patent Application No. 20808670.2-1107 on Dec. 15, 2022, 20 pages.

European Office Action issued in corresponding European Patent Application No. 20808670.2-1107 on Nov. 21, 2022, 7 pages.

Iranian Examination Report issued in corresponding Iranian Patent Application No. 140050140003006622 on Dec. 10, 2022, 26 pages.

Japanese Patent Office Communication regarding Third Party Submission issued in corresponding Japanese Patent Application No. 2021-569957 on Nov. 4, 2022, 34 pages.

Japanese Office Action issued in corresponding Japanese Patent Application No. 2021-569957 on Jun. 2, 2022, 13 pages.

Korean Office Action issued in corresponding Korean Patent Application No. 10-2021-7041493 on Nov. 11, 2022, 23 pages.

Korean Communication regarding Third Party Submission issued in corresponding Korean Patent Application No. 10-2021-7041493 on Jul. 18, 2022, 39 pages.

Mexican Notice of Allowance issued in corresponding Mexican Patent Application No. MX/a/2021/014223 on Oct. 18, 2022, 3 pages.

Malaysian Examination Report issued in corresponding Malaysian Patent Application No. PI2021006898 on Nov. 3, 2022, 2 pages.

Brazilian Written Opinion issued in corresponding Brazilian Patent Application No. BR122022007777-3 on Nov. 15, 2022.

A.M. Al-Sabagh et al., "Greener Routes for Recycling of Polyethylene Terephthalate", Egyptian Petroleum Research Institute, Egyptian Journal of Petroleum (2016) 25, 53-64, www.elsevier.com/locate/egyjp, www.sciencedirect.com, http://dx.doi.org/10.1016/j.ejpe.2015.03.001, 12 pages.

Indonesian Office Action issued in corresponding Indonesian Patent Application No. P00202110350 on Sep. 8, 2023.

Korean Office Action issued in corresponding Korean Patent Application No. 10-2021-7041493 on Nov. 6, 2023.

Canadian Office Action issued in corresponding Canadian Patent Application No. 3,141,282 on Mar. 24, 2023.

Chinese Office Action issued in corresponding Chinese Patent Application No. 202080052524.9 on Feb. 17, 2023.

Japanese Office Action issued in corresponding Japanese Patent Application No. 2021-569957 on Apr. 10, 2023.

Korean Office Action issued in corresponding Korean Patent Application No. 10-2021-7041493 on Mar. 2, 2023.

Japanese Office Action issued in corresponding Japanese Patent Application No. 2023-133672 on Sep. 2, 2025.

El Salvador Office Action issued in corresponding El Salvador Patent Application No. 2025007082 on Aug. 27, 2025.

Chile Office Action issued in corresponding Chile Patent Application No. 202103066 on Sep. 1, 2025.

El Salvador Office Action issued in corresponding El Salvador Patent Application No. 2025007083 on Jul. 29, 2025.

Third Party Submission Notice issued in corresponding Japanese Patent Application No. 2023-133672 on Aug. 5, 2025.

Third Party Submission Notice issued in corresponding Japanese Patent Application No. 2021-569957 on Aug. 5, 2025.

* cited by examiner
† cited by third party

PROCESS FOR FORMATION OF ADDITIVE-CONTAINING POLYESTER

CROSS-REFERENCE TO RELATED APPLICATIONS

This application is a continuation-in-part of U.S. Ser. No. 16/808,939 filed Mar. 4, 2020, which claims priority to U.S. Provisional No. 62/850,168 filed May 20, 2019. The entirety of both applications is incorporated herein by reference for all purposes.

BACKGROUND

Polyethylene Terephthalate (PET) is a crystallizable polymer, in which crystallization influences many properties, such as clarity, stiffness and strength of the PET product. PET has a slow crystallization, which leads to long cycle times that are not commercially viable. Furthermore, PET has a low heat distortion temperature (HDT), such that the PET article can soften at relatively low temperatures.

Currently, PET is used in high quantities to package goods, especially in food stuffs, such as for beverage containers, or other commodities. In order to protect the environment, lessen the demand on landfills, and lessen the demand for more oil in order to produce PET, PET recycle techniques need to be developed. However, recycled PET often suffers from fabrication memory, which results in recycled PET having unfavorable properties that are not present in virgin PET. However, recycling PET is important, and thereby recycling protocols for PET that produce recycled PET with properties similar to virgin PET would be beneficial. As such, a recycled PET polymer having better properties, faster crystallization, and higher HDT while maintaining the good properties of PET is desirable.

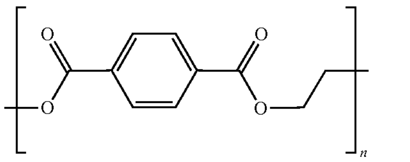

PET

Thus, it would be advantageous to have improved PET recycling techniques.

SUMMARY

In some embodiments, a method for reclaiming polyester includes: providing a feed of recycled polyester, wherein the feed of recycled polyester includes polyester particles, off spec polyester flake, off spec polyester resin, or other form of polyester; providing a feed of polyester precursors; and converting the recycled polyester and the polyester precursors into reclaimed polyester. In some aspects, the recycled polyester feed is depolymerized in a de-polymerization reaction vessel; and/or the recycled polyester feed is depolymerized from a polymerization reaction vessel. In some aspects, the de-polymerization reaction vessel and/or polymerization reaction vessel receives one or more of: water; methanol; acid or base; or ethylene glycol. In some aspects, the water de-polymerizes the recycled polyester to produce terephthalic acid and ethylene glycol; the methanol de-polymerizes the recycled polyester to produce dimethyl terephthalate and ethylene glycol; the acid or base is in aqueous form and de-polymerizes the recycled polyester to produce terephthalic acid and ethylene glycol; or the ethylene glycol de-polymerizes the recycled polyester to produce bis-hydroxyethyl terephthalate (BHET). In some aspects, the reclaimed polyester is characterized as virgin polyester or is indistinguishable from virgin polyester. In some aspects, the feed of polyester includes PAT. In some aspects, the feed of polyester includes PET.

In some embodiments, the de-polymerization reaction vessel and/or polymerization reaction vessel is any batch or continuous reaction vessel, which may be configured as mixer capable of mixing liquid polyester in batch or continuous formats, such as a single screw mixer, double-screw mixer, continuous kneader, reciprocating screw mixer, twin-screw extruder, continuous plow mixer, or the like. In some aspects, the de-polymerization reaction vessel and/or polymerization reaction vessel also performs one or more of: degassing, homogenizing, dispersing, or heating.

In some embodiments, the method includes continuously transferring the reclaimed polyester to a mixing device, for example a compounder or kneader, where at least one additive is added to the reclaimed polyester to form additive-containing reclaimed polyester. In one embodiment, the reclaimed polyester is compounded with organic or inorganic fillers. In one embodiment, the reclaimed polyester is mixed with a solid masterbatch. In one embodiment, the reclaimed polyester is mixed with a liquid additive to, for example, adjust viscosity and/or color.

In some embodiments, the method includes providing the reclaimed polyester (with or without additives) as output to an output system. In some aspects, the output system provides the reclaimed polyester to storage or a polyester product formation system or an analytical system. In some aspects, the analytical system includes one or more analytical systems capable of: determining intrinsic viscosity of reclaimed polyester; determining flow rate of reclaimed polyester; determining melting point of reclaimed polyester; determining crystallization temperature of reclaimed polyester; determining a differential scanning calorimetry profile of reclaimed polyester; or determining heat distortion temperature of reclaimed polyester. In some aspects, the polyester product formation system is configured to: form a product from only the reclaimed polyester; or combine the reclaimed polyester with a second feed of polyester (second PAT feed) to produce a product of a polyester alloy.

In some embodiments, the feed of recycled polyester is devoid of another polymer, and/or the polyester precursors is devoid of another polymer. In some aspects, the feed of recycled polyester consists essentially (or consists of) PAT, and/or the polyester precursors consists essentially (or consists of) PAT precursors. In some aspects, the feed of recycled polyester consists essentially (or consists of) PET, and/or the polyester precursors consists essentially (or consists of) PET precursors. In some aspects, the recycled polyester includes recycled PET flake or off spec PET resin. In some aspects, the feed of recycled polyester includes water at an amount less than 5%, less than 1%, less than 0.1%, at a trace amount of water, or is devoid of water. In some aspects, the recycled PET flake or off spec PET resin consists essentially of (or consists of, or includes) 0-100% PET. In some aspects, the recycled PET flake or off spec PET resin consists essentially of (or consists of or includes) 0-10%, 0-20%, 0-30%, 0-40%, 0-50%, 0-60%, 0-70%, 0-80%, 0-90%, or 0-100% PET. In some aspects, the feed of recycled polyester consists essentially of (or consists of or includes) 0-100% PET. In some aspects, the feed of recycled polyester consists essentially of (or consists of or includes) 0-10%, 0-20%, 0-30%, 0-40%, 0-50%, 0-60%, 0-70%, 0-80%, 0-90%, or 0-100% PET.

In some embodiments, the method can include: depolymerizing the recycled polyester before mixing with the polyester precursors; and/or depolymerizing the recycled polyester during or after mixing with the polyester precursors. In some aspect, the method can include polymerizing the depolymerized polyester monomers with the polyester precursors to form a reclaimed polyester from polymerizable reagents that polymerize to form PET. In some aspects, the polymerization reaction vessel receives the polyester precursors from precursor storage, each precursor being stored separately or in any un-reacting combination. In some aspects, the polyester precursors include first precursors that react with second precursors to form polyester. In some aspects, the polyester precursors comprise PET precursors that include: (1) a first PET precursor including a PTA and/or DMT; and (2) a second PET precursor including a MEG and/or DEG. In some aspects, the polyester precursors include Cyclohexanedimethanol and the product is glycolized polyester. In some aspects, the polyester precursors include IPA. In some aspects, the first precursor is provided separately from the second precursor. In some aspects, the first precursor is mixed with the second precursor under non-polymerizing conditions. In some aspects, the first precursor is mixed with the second precursor to form a precursor mixture, and the recycled polyester is mixed into the precursor mixture. In some aspects, the first precursor is mixed with the second precursor to form a precursor mixture, and the recycled polyester and/or depolymerized polyester monomers are mixed into the precursor mixture. In some aspects, the first precursor is mixed with the second precursor to form a precursor mixture, and the depolymerized polyester monomers are mixed into the precursor mixture.

In some embodiments, the method can include: mixing the first precursor with the second precursor to form a precursor mixture; mixing the recycled polyester into the precursor mixture to form a depolymerization mixture; and performing the depolymerization with the depolymerization mixture. In some aspects, the method can include: mixing the first precursor with the second precursor to form a precursor mixture; and mixing the depolymerized polyester monomers into the precursor mixture to form a polymerization mixture; and performing the polymerization with the polymerization mixture. In some aspects, the method can include: performing the depolymerization with the recycled polyester before being mixed with the first precursor and second precursor.

In some embodiments, the method can include: performing a first depolymerization; performing a first polymerization; performing a second depolymerization; performing a second polymerization; and repeating a depolymerization-polymerization cycle for n cycles, wherein n is an integer.

In some embodiments, the method can include: introducing the recycled polyester into a continuous reactor stream; depolymerizing the recycled polyester in the continuous reactor stream; and polymerizing the depolymerized polyester monomers with the polyester precursors in the continuous reactor stream. In some aspects, the polymerizing occurs between about 200° C. and about 330° C. In some aspects, the polyester precursors comprise precursors that include: (1) a first precursor including a PTA and/or DMT and/or IPA; and (2) a second PET precursor including a MEG and/or DEG and/or PETG. In some aspects, the recycled polyester has a weight percentage of between 1 and 50% of total polymerizing composition weight of the reclaimed polyester.

In some embodiments, the method can include outputting the reclaimed polyester as: a chip stream for forming pellets; and/or a polyester sheet.

In some embodiments, the method can include directly and continuously adding the reclaimed polyester to a mixing device, for example a compounder or a kneader, to add additives to the reclaimed polyester and form additive-containing reclaimed polyester. After the addition of additives, the reclaimed polyester can then be formed into pellets and/or chips.

Additives that can be directly added to the reclaimed polyester include solid masterbatches, organic or inorganic fillers, liquid color, and viscosity enhancers. Additional additives that can be added include thermal additives, UV stabilizers, impact modifiers, stabilizing agents, nucleating agents, antistatic agents, lubricants, fillers (inorganic or organic), pigments or colorants, chemical blowing agents, tackifiers, and intrinsic viscosity enhancers.

Additives can modify one or more properties of the reclaimed polyester, including UV light resistance, flame retardant, anti-fouling, anti-static, lubrication, anti-slip, corrosion inhibitors, anti-microbial, anti-oxidants, and phosphorescence.

In one embodiment, an inorganic filler is compounded with the reclaimed polyester. Non-limiting examples of inorganic fillers include, but are not limited to, calcium carbonate, kaolin (hydrous aluminum silicate), alumina trihydrate, calcium sulfate, and talc. In one embodiment, an organic filler is compounded with the reclaimed polyester.

In one embodiment, a viscosity enhancer is mixed with the reclaimed polyester. Non-limiting examples of viscosity enhancers include, but are not limited to, fumed silica and ethylene glycol. In one embodiment, ethylene glycol is added to the reclaimed polyester to enhance the viscosity of the reclaimed polyester.

In one embodiment, a solid color masterbatch is added to the reclaimed polyester.

In some embodiments, the method can include controlling at least one output mass flow by controlling the pressure of a reclaimed polyester melt with pressure control loops prior to said forming a product. In some aspects, the controlling is in a die flowing system that includes the use of an outlet pump, the outlet pump directly controlling the flow in the die flowing system.

In some embodiments, the method can include: depolymerizing the recycled polyester to obtain depolymerized polyester monomers; and polymerizing the depolymerized polyester monomers with the polyester precursors to form a reclaimed polyester. In some instances, the recycled polyester includes post-industrial flake, cleaned and/or washed post-consumer flake.

In some embodiments, a system for reclaiming polyester can include: a feed of recycled polyester, wherein the feed of recycled polyester includes polyester particles, off spec polyester flake, off spec polyester resin, or other form of polyester; a feed of polyester precursors; a reactor configured for converting the recycled polyester and the polyester precursors into reclaimed polyester; and an output of reclaimed polyester. In some embodiments, a system for reclaiming polyester can include: a feed of recycled polyester, wherein the feed of recycled polyester includes polyester particles, off spec polyester flake, off spec polyester resin, or other form of polyester; a feed of polyester precursors; a reactor configured for converting the recycled polyester and the polyester precursors into reclaimed polyester; a mixing device for adding additives to the reclaimed polyester, and an output of additive-containing reclaimed polyester. In some aspects, the reactor is: a de-polymerization reaction vessel having the recycled polyester feed; and/or a polymerization reaction vessel having the recycled polyester feed. In some aspects, the de-polymerization reaction vessel and/or polymerization reaction vessel is operably coupled to a supply of one or more of: water; methanol; acid or base; or ethylene glycol.

In some embodiments, the reactor is configured for: depolymerizing the recycled polyester to obtain depolymerized polyester monomers; and/or polymerizing the depolymerized polyester monomers with the polyester precursors to form the reclaimed polyester. In some aspects, the feed of polyester includes PAT. In some aspects, the feed of polyester includes PET. In some aspects, the reactor is any batch or continuous reaction vessel, which may be configured as mixer capable of mixing liquid polyester in batch or continuous formats, such as a single screw mixer, double-screw mixer, continuous kneader, reciprocating screw mixer, twin-screw extruder, continuous plow mixer, or the like. In some aspects, the reactor is configured to perform one or more of: degassing, homogenizing, dispersing, or heating.

In some embodiments, the polyester product formation system is configured to a mixing device for adding additives to reclaimed polyester to form additive-containing reclaimed polyester. In one embodiment, the mixing device is downstream of the reactor, but upstream of an output system.

In some embodiments, the system includes an output system. In some aspects, the output system is configured to provide the reclaimed polyester to storage or a polyester product formation system or an analytical system, by being operably coupled therewith. In some aspects, the polyester product formation system is configured to: form a product from only the reclaimed polyester; or combine the reclaimed polyester with a second feed of polyester (second PAT feed) to produce a product of a polyester alloy.

In some embodiments, the feed of recycled polyester is devoid of another polymer, and/or the polyester precursors is devoid of another polymer. In some aspects, the feed of recycled polyester consists essentially (or consists of) PAT, and/or the polyester precursors consists essentially (or consists of) PAT precursors. In some aspects, the feed of recycled polyester consists essentially (or consists of) PET, and/or the polyester precursors consists essentially (or consists of) PET precursors. In some aspects, the recycled polyester includes recycled PET flake or off spec resin. In some aspects, the feed of recycled polyester includes water at an amount less than 5%, or less than 1%, or less than 0.1%, or a trace amount of water or is devoid of water. In some aspects, the recycled PET flake or off spec PET resin consists essentially of (or consists of or includes) 0-100% PET. In some aspects, the recycled PET flake or off spec PET resin consists essentially of (or consists of or includes) 0-10%, 0-20%, 0-30%, 0-40%, 0-50%, 0-60%, 0-70%, 0-80%, 0-90%, or 0-100% PET. In some aspects, the feed of recycled polyester consists essentially of (or consists of or includes) 0-100% PET. In some aspects, the feed of recycled polyester consists essentially of (or consists of or includes) 0-10%, 0-20%, 0-30%, 0-40%, 0-50%, 0-60%, 0-70%, 0-80%, 0-90%, or 0-100% PET.

In some embodiments, the system can include a controller having a tangible non-transitory memory device having computer executable instructions for controlling the system to perform the method of one of the embodiments. In some aspects, the controller is configured for: depolymerizing the recycled polyester before mixing with the polyester precursors; and/or depolymerizing the recycled polyester during or after mixing with the polyester precursors. In some aspects, the controller is configured for controlling the polymerizing of the depolymerized polyester monomers with the polyester precursors to form a reclaimed polyester from polymerizable reagents that polymerize to form PET. In some aspects, the controller is configured for controlling the polymerization reaction vessel to receive the polyester precursors from a precursor storage, each precursor being stored separately or in any un-reacting combination. In some aspects, the controller is configured for controlling: mixing the first precursor with the second precursor to form a precursor mixture; and mixing the recycled polyester into the precursor mixture to form a depolymerization mixture; and performing the depolymerization with the depolymerization mixture. In some aspects, the controller is configured for controlling: mixing the first precursor with the second precursor to form a precursor mixture; and mixing the depolymerized polyester monomers into the precursor mixture to form a polymerization mixture; and performing the polymerization with the polymerization mixture. In some aspects, the controller is configured for performing the depolymerization with the recycled polyester before being mixed with the first precursor and second precursor. In some aspects, the controller is configured to directly add additives to the reclaimed polyester.

In some embodiments, it is provided a reclaimed polyester 423 produced by the method for reclaiming polyester according to one or any of the embodiments disclosed herein.

In some embodiments, it is provided a method for making polyester objects comprising:

- providing a polyester melt, wherein the polyester is a reclaimed polyester 423 according to any one of the embodiments disclosed herein;
- flowing the polyester melt to a valve having multiple outlets;
- flowing the polyester melt from the valve having multiple outlets to a die forming system, the die forming system including a plurality of dies, and a chip system; and
- forming the polyester objects from the polyester melt.

In some embodiments, it is provided a method for making polyester objects comprising:

- providing a polyester melt, wherein the polyester is a reclaimed polyester 423 according to any one of the embodiments disclosed herein;
- flowing the polyester melt to a valve having multiple outlets;
- flowing the polyester melt from the valve having multiple outlets to a mixing device, for example a compounder or kneader, to add additives, including, but not limited to inorganic or organic fillers, solid masterbatches, and/or liquid additives; and
- forming the polyester objects from the polyester melt.

In some embodiments of the method for making polyester objects, the polyester objects are polyester sheets or pellets.

In some embodiments, it is provided polyester objects made by the method for making polyester objects in one or any of the embodiments disclosed herein.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1A:
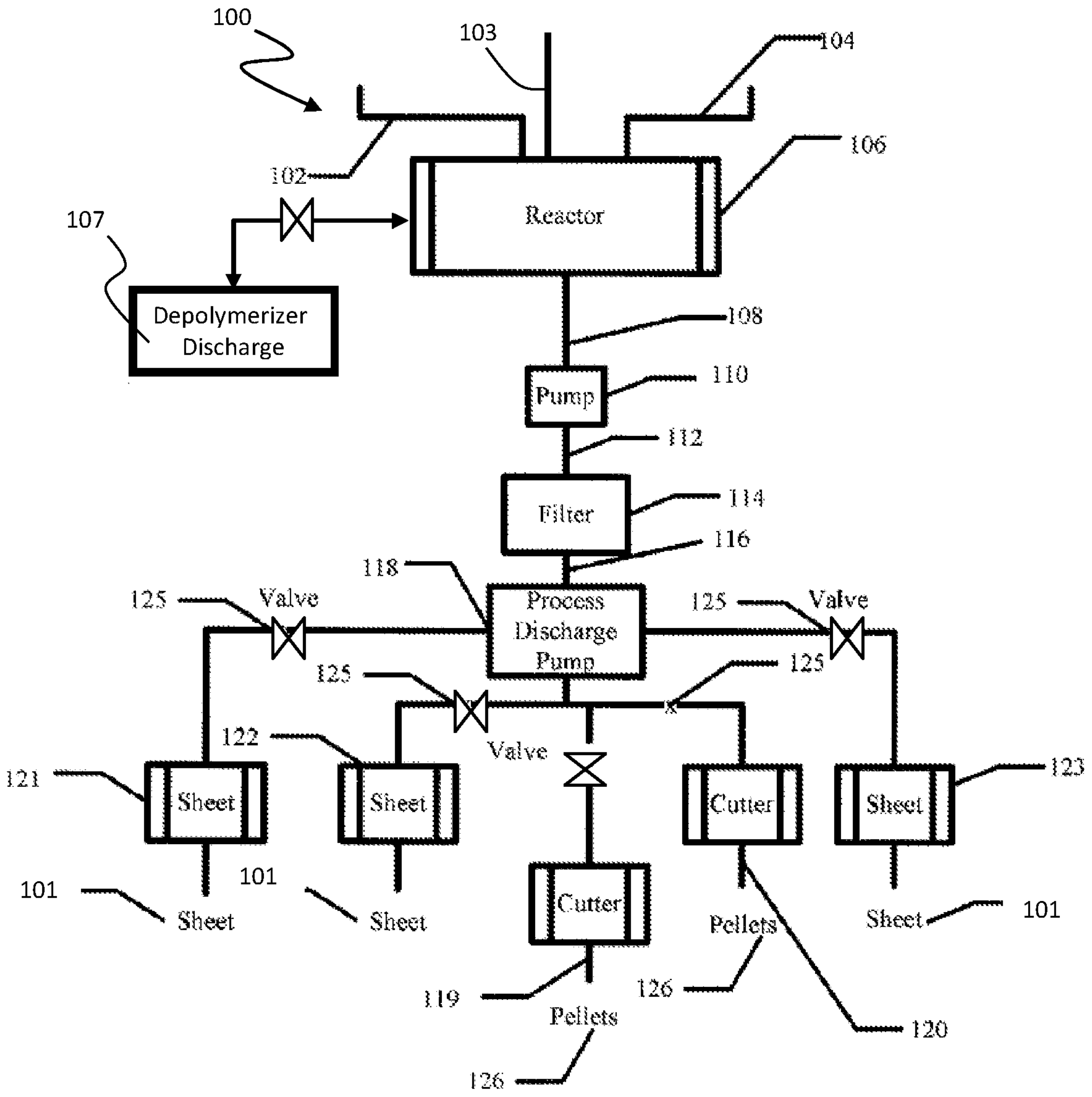
FIG. 1A illustrates an embodiment of a PET reclamation system.

The elements of the figures are arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are explicitly contemplated herein.

Generally, the present technology relates to a process for adding recycled PET polymer back into the feed stream of a PET reactor. The resultant PET polymer produced from this process has properties that allow it to be used to produce new products without any limitations, which can allow the resultant PET polymer that includes the recycled PET to be used in substantially any PET product. The PET reclamation process combines recycled PET with fresh PET reagent in order to form reclaimed PET, which can be treated as virgin PET. The PET reclamation process produces a cost-effective method to reclaim clean post-consumer PET flake and off spec PET resin.

The PET reclamation processes described can use recycled PET from any source. The recycled PET can be in any form, such as flake (e.g., ground material produced from recycled product), spec resin, or any other recycled PET form. Also, the PET reclamation process can use other reclaimed PET, such as mixed re-extruded recycled PET (e.g., recycled PET co-extruded optionally with or without virgin PET or other recycled PET), co-extruding sheet PET with the reclaimed PET in the center layer and virgin PET as outer layers, depolymerized PET (e.g., processed with solvent, or other processing, enzyme de-polymerization). Previously, these recycled PETs were sub-standard as is known in the prior art or overly costly (e.g., de-polymerization). Thus, any recycled PET source or depolymerized PET source can be used for the PET reclamation process described herein.

Now, the present PET reclamation technique uses a recycled PET or any post-consumer product PET in substantially any form without any state of de-polymerization. While the present PET reclamation technique can use de-polymerized PET, the present PET reclamation technique was developed to omit or avoid the entirety of the PET de-polymerization process. Accordingly, aspects of the invention specifically exclude using de-polymerized PET as a reagent or source material in the PET reclamation reactor.

The present PET reclamation technique results in a reclaimed PET polymer that has no processing history, no composition or shape memory, and/or no indication that the PET within a product formed therefrom (from the reclaimed PET polymer) was ever included in a consumer product, such as a bottle, sheet, spoon, or anything else. The properties of the reclaimed PET polymer made in this present PET reclamation process can be considered or chemically characterized and/or physically characterized as being the same as virgin PET formed from virgin PET resin. Thus, the present PET reclamation technique can effectively use PET flake or off spec resin as a feedstock in producing recycled PET resin that is equivalent to virgin PET resin.

In some embodiment, the present PET reclamation technique includes chemically disassembling any PET polymer (e.g., recycled PET polymer) back to its original monomer and/or small polymers and then re-polymerizing the monomers and/or small polymers back into a full polymer again. The small polymers can include "n" monomers, where "n" can be any integer from 2 to 50, more preferably from 2 to 25, more preferably from 2 to 15, more preferably from 2 to 10, or less than 10 monomers. The chemical disassembly of the PET results in the monomers and small polymers losing any processing history, prior composition or shape memory, and/or any prior chemical and/or physical indication that the reclaimed PET within a product formed therefrom (e.g., from the reclaimed PET polymer) was ever included in a consumer product. Thus, the reclaimed PET has no relationship with the original recycled polymer and behaves or is characterizable (e.g., chemical and/or physical) as a new polymer.

The reclaimed PET produced as described herein overcomes problems with conventional PET recycling. In a conventional PET recycling process, the recycled PET is merely melted and mixed with another recycled PET and/or virgin PET resin. The resulting mixed PET polymer melts and is mixed, but the individual PET polymers remains largely that of the various PET resins involved. For instance, if one resin has an intrinsic viscosity (IV) of 0.60 and another resin has an IV of 0.80, when they are mixed in a ratio of 50:50 the resultant resin IV can be 0.70 (e.g., $50\times0.60=0.30$ $50\times0.80=0.40$ $0.30+0.40=0.70$). The reason post-consumer recycle is recovered at low levels is because the applications for uses of this material are limited because of the compromised chemical and/or physical properties. Now, the present PET reclamation technique eliminates these limitations and provides a reclaimed PET that is substantially chemically and physically identical to virgin PET resin.

In some embodiments, the present PET reclamation technique combines recycled PET with PET reagents with water that is processed in a depolymerization reaction such that recycled PET polymer absorbs the water to cause monomer separation to produce the monomers and small PET polymers. At some point, a polymerization reaction occurs with the monomers and/or small PET polymers to form longer polymer chains and results in PET resin. This PET resin is considered to be the reclaimed PET polymer because it includes recycled PET and virgin PET in an indistinguishable manner.

In some embodiments, the PET polymerization is a condensation reaction. A condensation reaction is when two molecules react to form a new molecule and a molecule of water is released. The PET polymerization chemistry begins with PET reagents, such as terephthalic acid (PTA) and mono ethylene glycol (MEG) that combine and react to form what is referred to as the PET monomer bis-(2-hydroxyethyl)-terephthalate (BHET). As such, the first step in the polymerization includes the PTA molecules reacting with the MEG molecules to form BHET, and with each reaction, a molecule of water is formed. For this reaction and subsequent reactions to continue, the water that is formed must be removed (e.g., used to break a recycled PET chain). Once all the PTA has reacted, then the BHET (e.g., monomer) molecules begin to react with each other to form small PET polymers that react with each other and any BHET to form longer and longer PET polymer chains. During the polymerization phase, the process can include removing water so that it does not react with other PET polymer molecules by removing water from the reaction zone (e.g., by evaporation). Accordingly, the liquid phase PET polymerization process can include a series of process steps, each being hotter and each having a lower pressure in order to continue to force the water byproduct to evaporate and leave the reaction zone (e.g., leave the reaction vessel).

In some embodiments, the PET reclamation technique is performed on the basis that a polymer molecule does not want to exist in the presence of its monomer especially if there is water in the same environment. When the recycled polymer is introduced to a BHET monomer and a water rich environment, the natural forces of chemical equilibrium take over, the polymer begins to absorb water, and its monomers begin to separate very rapidly. Also, virgin PTA and MEG have been introduced to the reaction zone as in a common polymerization process. This results in the reaction zone including substantially only monomers, some from the reaction of virgin PTA and MEG and some from the depolymerization of the recycled PET. Then, this mixture moves further down the reaction process where the monomers begin to form small polymers and then longer and longer PET polymer chains, and thereby the PET resin is a reclaimed PET resin.

In some embodiments, recycled PET, such as flake or off spec resin (e.g., herein off spec resin is considered to be recycled PET, but flake and off spec resin may be separate in some embodiment), is introduced into a reaction vessel.

In some embodiments, PET reagents, such as PTA and MEG are introduced into the reaction vessel along with the recycled PET. In some aspects, the PET reagents can include dimethyl terephthalate (DMT) along with the PTA or instead of the PTA. In some aspects, the PET reagents can include diethylene glycol (DEG) along with the MEG or instead of the MEG. In some aspects, the PET reagents can include glycolized polyester (PETG) along with the MEG and/or DEG or instead of the MEG and/or DEG.

In some embodiments, bulk liquid water is specifically not introduced (e.g., provided) into the reaction vessel. Instead, the water used in the depolymerization reaction can include water molecules that are adhered to the recycled PET, such as by condensation, bulk adherence, molecular adherence, or the like.

In some embodiments, bulk water is affirmatively introduced into the reaction vessel, such as by being provided into the reaction vessel. For example, the reaction vessel can include a port that is attached to a water source. Alternatively, the water can be mixed with a PET reagent and provided into the reaction vessel. Also, the water can be mixed with the recycled PET, such as PET flakes, and provided into the reaction vessel with the recycled PET.

Figure 5:
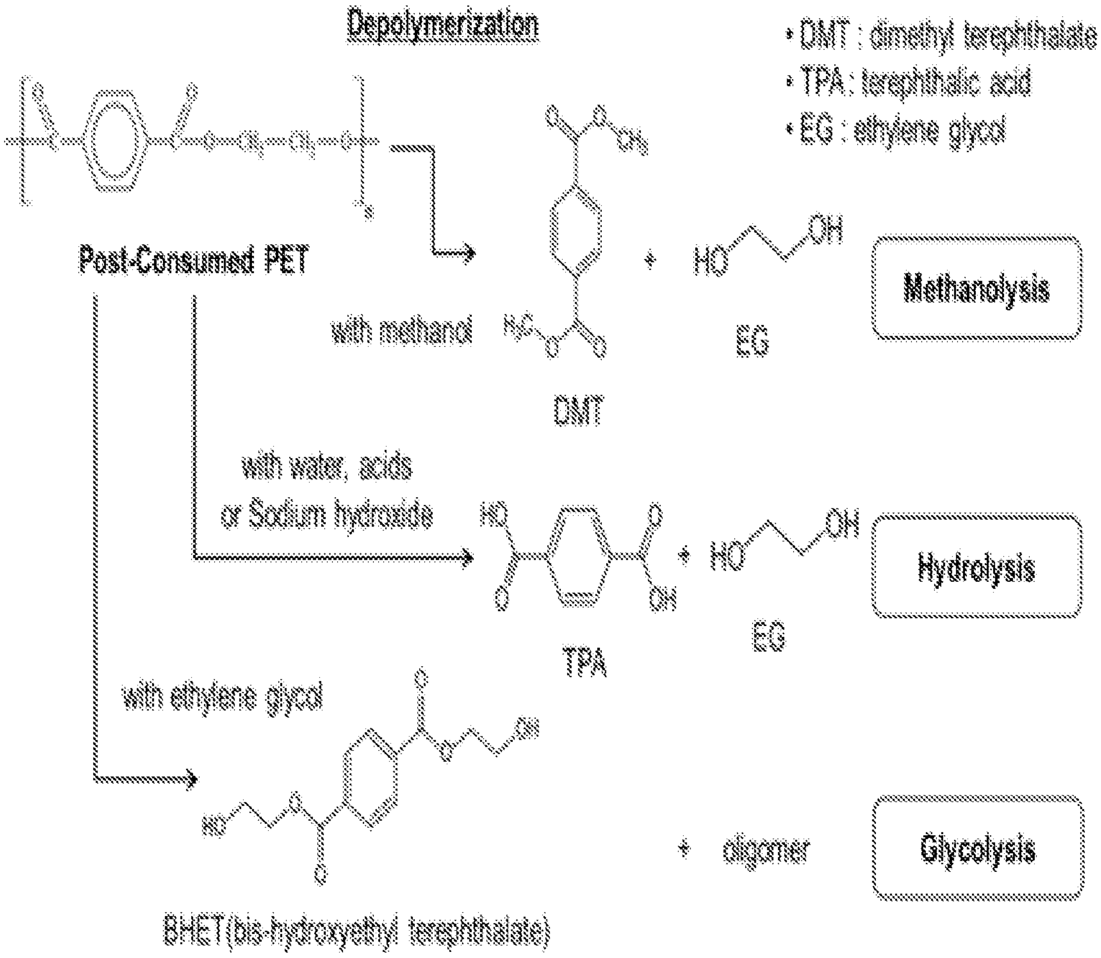
FIG. 5 shows depolymerization pathways.

In some embodiments a PET depolymerizer can be affirmatively introduced into the reaction vessel, such as by being provided into the reaction vessel. For example, the reaction vessel can include a port that is attached to a PET depolymerizer source. Alternatively, the PET depolymerizer can be mixed with a PET reagent and provided into the reaction vessel. Also, the PET depolymerizer can be mixed with the recycled PET, such as PET flakes, and provided into the reaction vessel with the recycled PET. The PET depolymerizer can include water, acidic water, alkaline water, methanol, aqueous methanol, ethylene glycol, aqueous ethylene glycol, and mixtures thereof. The acidic water can use any reasonable acid (e.g., HCl). The alkaline water can use any reasonable base (e.g., sodium hydroxide). As such, the PET depolymerizer can result in depolymerization of the recycled PET as shown in FIG. 5. As such, methanol can result in DMT and ethylene glycol (EG) via methanolysis. Water, whether neutral, alkaline, or acidic, can result in TPA and EG via hydrolysis. EG can result in BHET and PET oligomers (e.g., small PET molecules) via glycolysis. However, in some embodiments, a PET depolymerizer is specifically not affirmatively introduced, but may be provided as by being adhered or contained in a reagent, such as the recycled PET.

The polymerization of the depolymerized recycled PET and virgin PET reagents can be conducted as is known in the art of PET polymerization, such as by the incorporated references.

FIG. 1A illustrates an embodiment of a PET reclamation system 100, which can be used to make PET sheets. A first feedstock 102 of PET precursors and a second feedstock of recycled PET 104 are fed into the reactor 106 of the system for making reclaimed PET. In one embodiment, the PET precursors include: (1) a first PET precursor including a feedstock of PTA and/or DMT; and (2) a second PET precursor including a feedstock of MEG and/or DEG.

In another aspect of the present invention, a third feedstock 103 of secondary precursors, such as Cyclohexanedimethanol (CHDM) may be used in combination with the primary precursors, such as MEG or DEG. In this aspect, the final product is PETG.

In one embodiment, the two feedstocks 102 and 104 are processed in the reactor 106 together in order to depolymerize the recycled PET.

In one embodiment, the first feedstock 102 is added to the reactor 106 to undergo depolymerization, and then subsequent to at least partial or full depolymerization, the second feedstock 104 is added to the reactor 106.

In one embodiment, subsequent to depolymerization of the recycled PET, the two feedstocks 102 and 104 produce an intermediate BHET in the reactor 106, which may be converted to polyethylene terephthalate by heating at a temperature above the boiling point of the ethylene glycol or the reaction mixture under conditions effecting the removal of the glycol or water or other depolymerizer. The feedstocks 102 and 104 are reacted in the reactor 106 by esterification and polymerization to produce the PET melt. The heating in the reactor 106 may occur at a temperature as high as 325° C., if desired. During heating, pressure is reduced so as to provide rapid distillation of the excess glycol, water, or other depolymerizer.

The reclaimed PET polymer produced in the reactor 106 may have an IV, as measured in orthochlorophenol at 25° C., in excess of 0.3 dl/gm. More preferably, the IV of the reclaimed PET polymer ranges from about 0.4 to about 1.0 dl/gm, measured in orthochlorophenol at 25° C. Still more preferably, the reclaimed PET polymer is chemically and physically sufficient to be employed in the present system for making PET sheets 101. Such a reclaimed PET polymer can have an IV of about 0.5 to about 0.7 dl/gm as measured in orthochlorophenol at 25° C. The thermoplastic polyester containing polymers of this present PET reclamation system 100 for making PET sheets 101 have a preferred melting point in the range from about 200° C. to about 330° C., or more preferably from about 220° C. to about 290° C., and most preferably from about 250° C. to about 275° C.

One aspect of the present PET reclamation system makes a PET sheet 101. In another aspect, the present PET reclamation system for making PET sheets 101 is used to produce all types of products, including sheets, with all other types of molten polymers. Another exemplary molten polymer is a linear low density polyethylene (LLDPE) polymer. In addition to homopolymers, the present system for making PET sheets 101 may be used with copolymers of PET, such as adding CHDM in place of the ethylene glycol or isophthalic acid (IPA) in place of some of the terephthalate units in the second feedstock 104 (e.g., first PET precursor).

In one embodiment, the recycled PET may be any recycled polyalkyl terephthalate (PAT), and the PET reagents can be any reagents that react to form a PAT. The PAT can be:

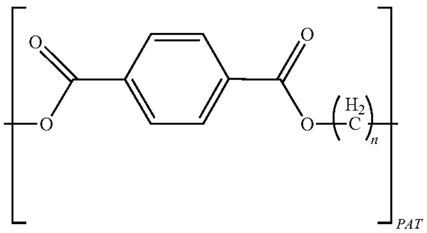

In the PAT, n may be any reasonable integer, such as 1 (Polymethylene Terephthalate (PMT)), 2 (Polyethylene Terephthalate (PET)), 3 Polypropylene Terephthalate (PPT), 4 (Polybutylene Terephthalate (PBT)), or 5 Polypentylene Terephthalate (PPentT), or the like (e.g., n is 6, 7, 8, 9, 10, etc.).

Many different kinds of additives can also be added into the PET melt depending on the nature of the desired properties in the finished article. Such additives may include, but are not limited to, colorants, anti-oxidants, acetaldehyde reducing agents, stabilizers, such as UV and heat stabilizers, impact modifiers, polymerization catalyst deactivators, melt-strength enhancers, chain extenders, antistatic agents, lubricants, nucleating agents, solvents, fillers, plasticizers and the like. Preferably, these additives are added into the reactor 106, but may be added at other locations of the present system for making PET sheets 101.

The reclaimed PET polymer in the form of a PET melt can be fed via pipe 108 to a master pump 110 where it is pumped to a filter 114 via pipe 112. In this embodiment, the master pump 110 feeds the PET melt throughout the distribution subsystem. The PET melt is passed through the filter 114 to clear the PET melt of any foreign particles either introduced through the feed stream or produced by the reaction. Preferably, the filter 114 is used to screen out any large gels, degraded particles, or extraneous material deleterious to the downstream melt pumps or to the final product. Various grades of filter medium or mediums (mechanical screens, sand, sintered metal, etc.) can be used. The proper design (volume, pressure drop, and residence time) of the filter 114 is important to maintain the proper pressure throughout the present PET reclamation system 101.

In some embodiments, the reclaimed PET is obtained directly from the reactor 106 without going through the pump 110 or filter 114.

The PET melt can be fed to a process discharge pump with distribution pump 118 via pipe 116. In this particular embodiment, the process discharge pump with distribution pump 118 has a distribution box with multiple outlets. Preferably, distribution pump 118 may have any number of outlets to fit a desired application. As shown two streams 119, 120 produce PET pellets 126. This material can be sold directly for bottles or utilized in a coextrusion process to produce a multi-layered film. Two cutter lines can be used to maintain maximum control. The two cutters are sized such that the maximum output of the reactor 106 could be handled by these cutters.

Additionally, the process discharge pump 118 also feeds PET melt into three sheet producing processes, 121, 122, and 123. Although only three sheet lines are noted, multiple lines could be added.

Figure 1B:
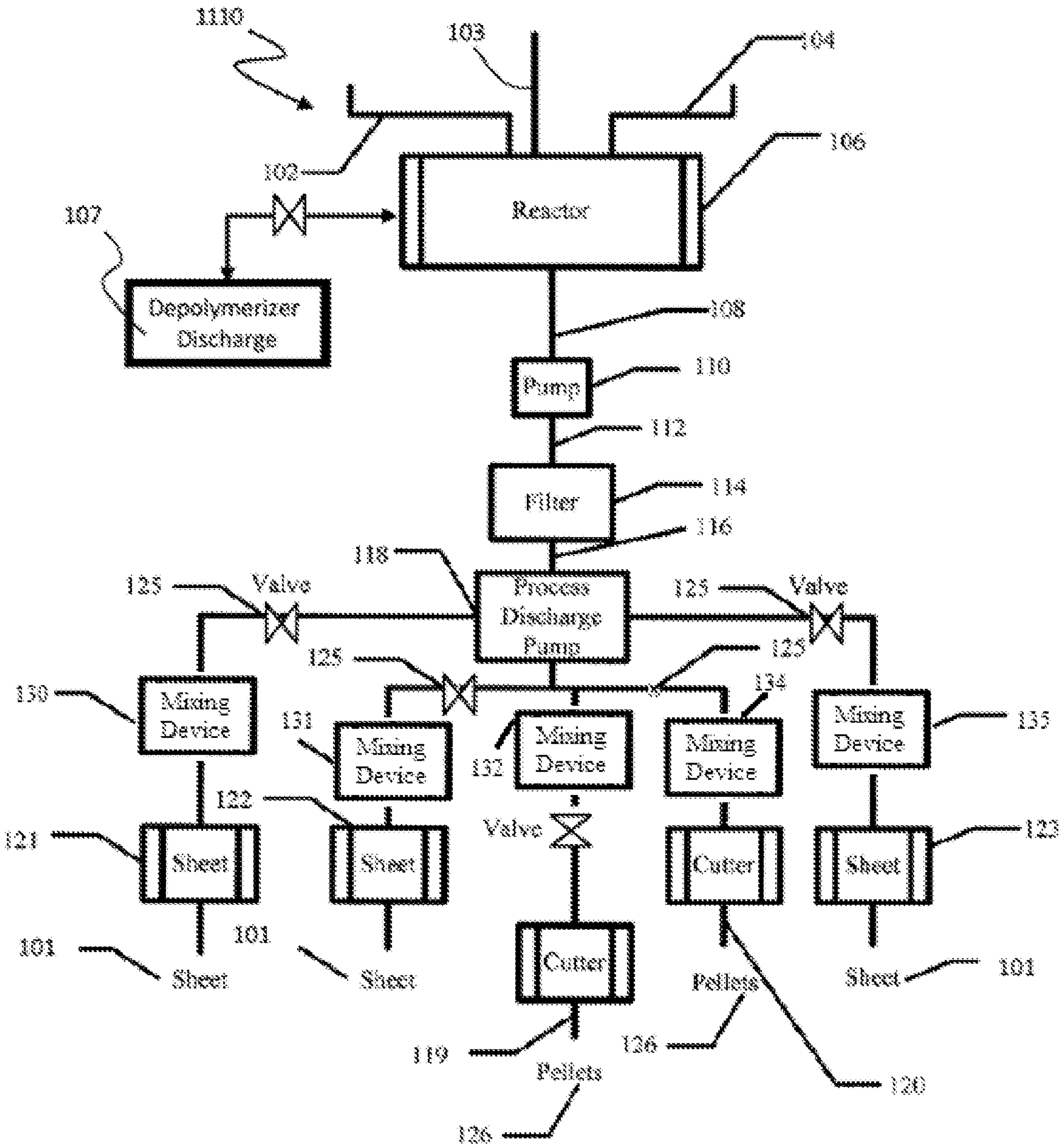
FIG. 1B illustrates an embodiment of a PET reclamation system that includes a mixing device for adding an additive.

In an alternative embodiment, additives can also be directly added to the PET melt. As illustrated in FIG. 1B with system 1110, the additive is added to the reclaimed polyester in a mixing device after the PET melt is fed through distribution pump 118, but before the PET melt is subjected to sheet producing processes, 121, 122, and 123 or streams 119 and 120 to product PET pellets. The additives are added via mixing device 130, 131, 132, 134, and/or 135. In one embodiment, the mixing device is a compounder. In one embodiment, the mixing device is a kneader. Although five mixing devices are shown, the system can include up to five mixing devices, for example one or two, or more than five mixing devices. These additives include, but are not limited to, organic and inorganic fillers, solid masterbatches, and/or liquid additives to adjust color and viscosity (IV).

The design of the system is such that the melt flow is minimized so that degradation and acetaldehyde are not problems. All the individual processes have control valves which are used in the final control stream as well as allowing a branch to be shut down completely.

Any of the lines may include a valve 125 to selectively control flow. Such a valve 125 may be controlled by a controller, which can be a computer that includes software stored on a tangible non-transient memory device with executable instructions for operating the PET reclamation system 100 or 1110. This includes the controller controlling the valve 125 as well as the reactor 106, pump 110, and cutters. As such, various sensors, such as thermocouples, pressure sensors, flow sensors, viscosity sensors, turbitity sensors, absorbance sensors, transmittance sensors, transparency sensors, translucency sensors, opaqueness sensors, or other sensors can be distributed throughout the system 100 or system 1110 for obtaining process data. The controller processes the process data and provides operational instruction data back to the components of the system 100 or system 1110, such as for control of the reactor 106 and pump 110. In one example, the reactor 106 includes a mixing device and/or a heating device, and thereby the controller controls the mixing and heating of the reactor 106. The controller can also control the valve between the reactor 106 and the depolymerizer discharge 107 that receives the discharged depolymerizer from the reactor 106, such as during the polymerization phase. The controller can provide the depolymerizer back to the reactor 106 during a depolymerization stage. While shown horizontally, the exit from the reactor 106 for the discharged depolymerize can be at the top of the reactor 106.

In one embodiment, the PET reclamation system 100 or system 1110 for making the reclaimed PET is a continuous process which is not shut down once it is started. One way to control the mass flow of the PET melt through the system 100 or system 1110 is by adjusting the mass flow of the feedstocks 102 and 104 (e.g., and/or 103) into the reactor 106. A pressure feedback loop can be used to control the process discharge pump, which can function as a pressure feedback pump 118. As shown in FIG. 1A and FIG. 1B, the pump 118 to the bypass chip stream 119 can be opened more or less to modulate the PET melt going into each process leg of the entire system 100 or system 1110. The pumps 110 and 118 are controlled by continuous feedback of the calculated flow needed to maintain pressure in each of the system branches, such as by the controller. These values are gathered from the branches and fed back to the main controller (e.g., PLC) and then used as the main speed control. Pressure loops within the system 100 or system 1110 trim the speeds. In this manner sufficient flow is distributed into the system 100 or system 1110. The pumps in each subsystem can then modulate the pressure to the final value. For example, each line can include a valve 125 and a pump. Excess flow can be entered into the system 100 or system 1110 to allow one cutter line to operate. As the flow in the system 100 or system 1110 is lowered or raised, the cutter system reacts to keep the flow and pressure into the sheet lines within operating parameters.

Figure 2:
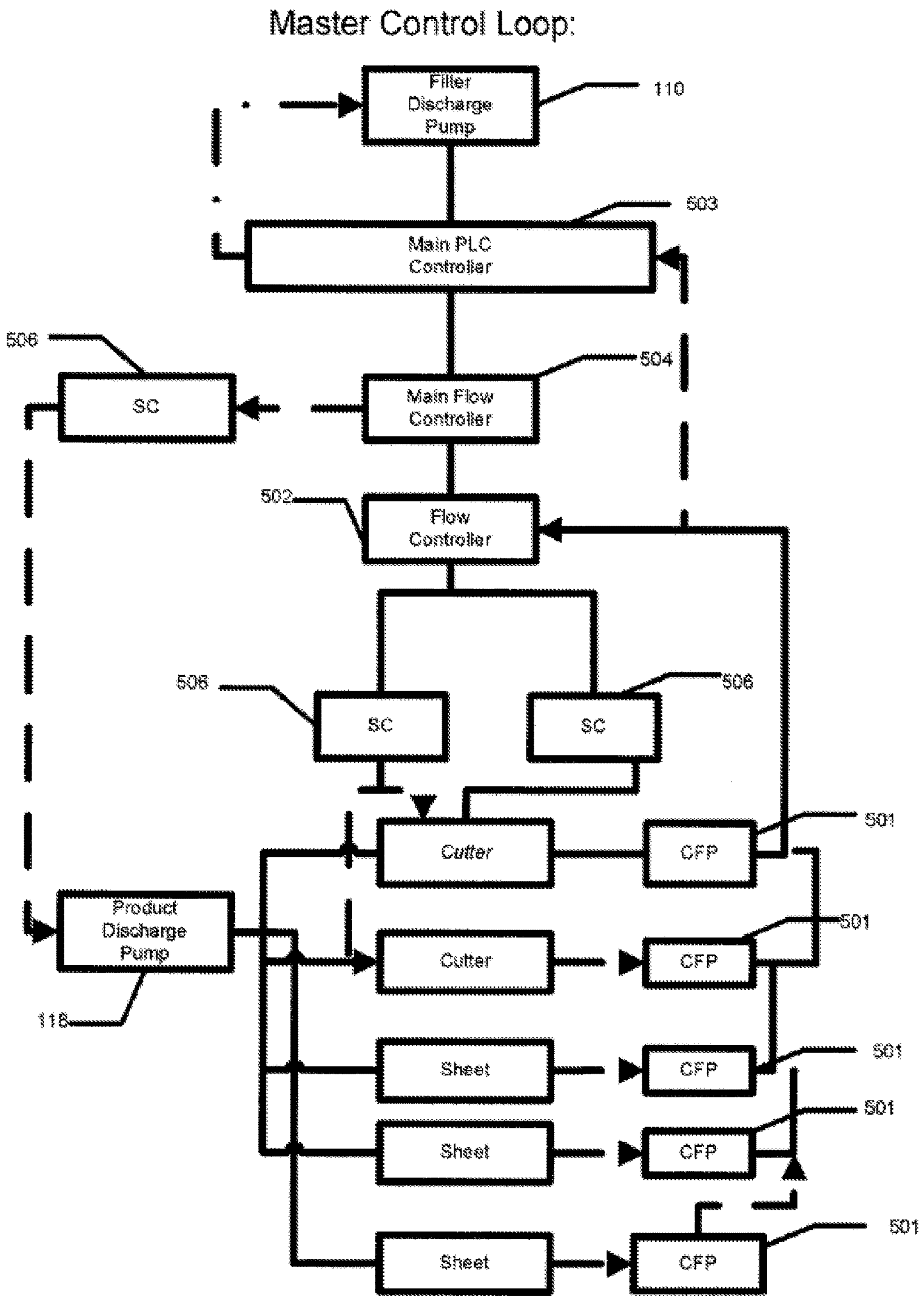
FIG. 2 illustrates a control loop for a PET reclamation system, such as for the pumps of the system of FIG. 1A or FIG. 1B.

FIG. 2 depicts the control loop for pumps 110 and 118. The melt pumps work on the assumption that constant volume is maintained for each revolution of the pump. When using melt pumps for plastic melts, the compressibility of the material becomes a factor. For any given polymer at a given temperature and inlet/outlet pressure configuration, there is a calculable throughput for a given pump. In order to precisely control the throughput at the sheet lines in the process we have developed, a control system uses the calculated flow of all the pumps as a control parameter.

As diagrammed in FIG. 2, an embodiment shows three sheet lines running there also have at least one of the cutter lines running. The calculated flow parameters (CFP) 501 can be calculated at each of the running lines and fed back to the main system controls 502, 503, and 504. The main system controllers can then control the main product discharge pump 118 and pump 110 to discharge sufficient polymer melt to maintain the suction side of all operating pumps. The pressure can be trimmed by operating pressure valves within the loops. This main control loop is constantly controlled to compensate for any line speed changes in any of the sheet lines. As the lines change speed, more or less material is directed to the cutter process. The cutter speeds (SC) 506 are trimmed continuously by the main system to maintain optimum pellet quality through the cutters.

Figure 3:
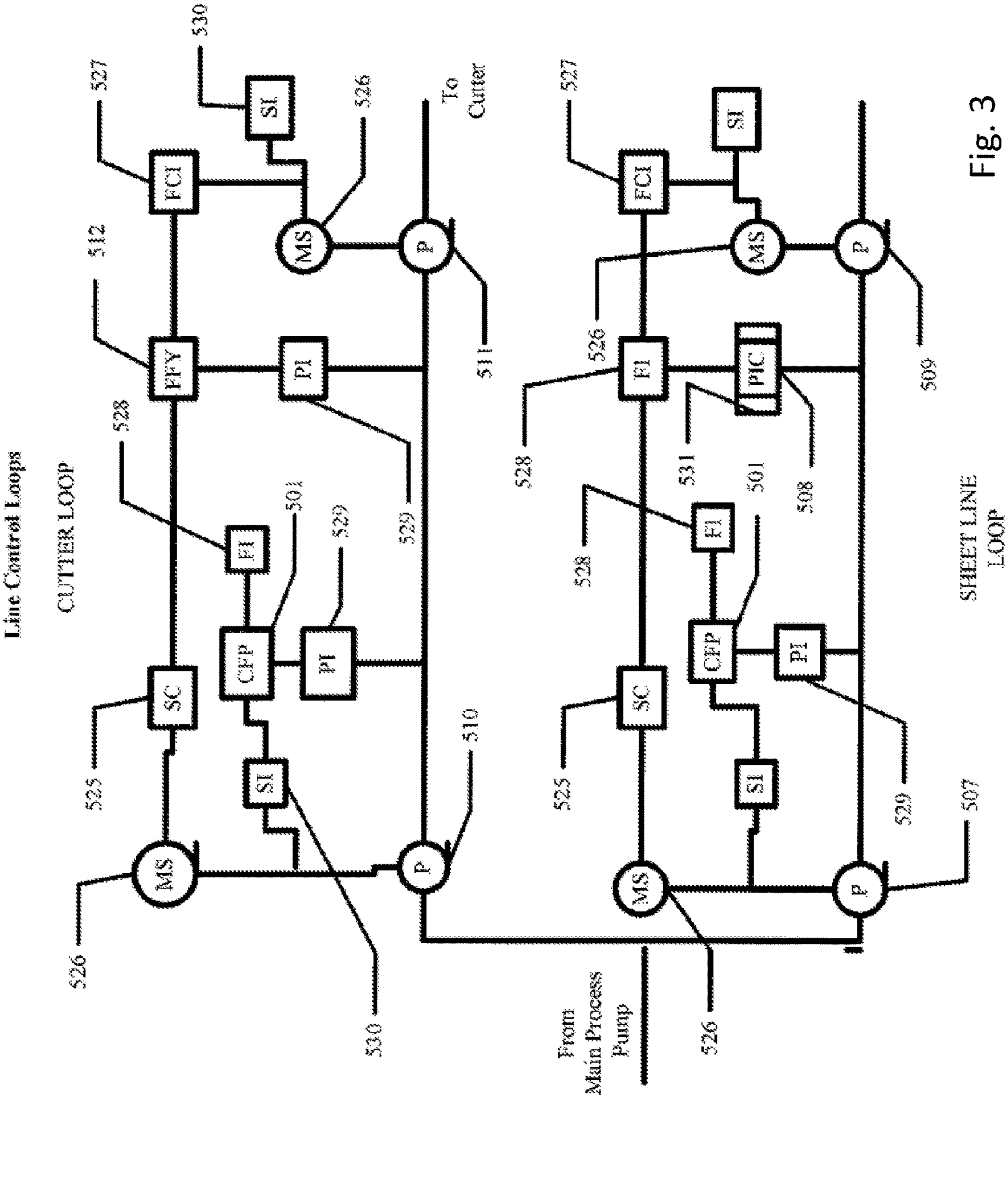
FIG. 3 illustrates individual loops that are used to control the output of the last pump to maintain quality both on the cutter loop and on the sheet line loop of FIG. 1A or FIG. 1B.

FIG. 3 details the individual loops that are used to control the output of the last pump to maintain quality both on the cutter loop and on the sheet line loop. The input into each of the loops is being controlled by the main loop while the output speed of the individual loops are used to maintain the pressure within the specified 1 bar using speed controls (SC) 525 and motor speeds (MS) 526. The sheet line speeds are dependent upon the sheet line speed and the die gap and width. The thickness of the sheet is the important parameter. As the speed of the sheet line increases or decreases the speed of the last pump must track the changes to maintain the precision in the thickness.

The main process pump feeds material to the system based on the calculated flow values provided by the controller. Values within the system help direct the appropriate flow to each of the branches. The flow from the main pump is directed into the primary sheet line pump 507. The speed of this pump is controlled by the feedback loop comprised primarily by the inlet pressure 508 to the outlet pump 509. To effectively control the flows and pressure, the system further includes numerous flow controllers and indicators (FCI) 527, flow indicators (FI) 528, pressure indicators (PI) 529, pressure indicators and controllers (PIC) 531, speed indicators (SI) 530, and speed controllers (SC) 525. The inlet suction pressure to the outlet pump is maintained at a constant pressure. If the sheet line speed is changed, then the loop is designed to feed back to all three pumps, main, primary, and outlet pumps. If the sheet line slows down substantially, then material can be diverted to the cutter line to prevent a massive flooding of the sheet line. Similarly, if the sheet line speeds up, then material from the cutter can be diverted back to the sheet line. Use of this higher order control stream allows the system to maintain constant pressure and a thickness tolerance of less than 1%. Preferably, the multiple pumps provide highly dependent thickness control with a constant pressure into the die forming units 121, 122, and 123. The first pump will modulate any large swings in pressure. The second pump and each proceeding pump will further reduce any modulation down to less than +/−1 bar after the final pump. This provides for the forming lines (outputs) to remain independent so they can slow down, start, stop, or increase speed independently of the other die forming units. The pressure control loops with the bypass chip stream 119 will provide this function.

The cutter loop is dependent upon flow rate. The cutter line can accommodate a minimum throughput as well as a maximum throughput. There are two cutter lines available, so as one line approaches maximum flow rate, the second line can be put online. The flow and speed are controlled, so a uniform pellet dimension is maintained by the cutters. The material from the main process pump is pumped to the manifold; appropriately placed valves allow the flow to be diverted to the primary cutter pump (P) 510. In one embodiment, the present system for making PET products (e.g., PET sheets 101) produces PET product in a continuous mode from the feedstocks 102, 104 directly from the melt phase of the reactor 106 to an extruder die without passing through a nitrogen treatment, an extruder and other steps and rolled or not in the longitudinal direction. In another embodiment, the present system 100 flows the PET melt directly from the reactor 106 and an extruder die onto rotary dies for the manufacturing of packaging material and other items.

In one embodiment, the die forming units 121, 122, and 123 as shown in FIG. 1A and FIG. 1B are a three roll stacks or air knife system. More preferably, the die forming units are a horizontal three roll stack system. Typically, downstream of the roll stack are auxiliary systems such as coaters, treaters, slitting devices, etc. that feed into a winder. These units are properly specified to the individual leg of the system and to the overall capacity of the reactor 106.

In another embodiment, another type of unit would be a low draw rotary die that forms parts such as bottle caps or lids directly on the rotary die from the formed sheet. In one embodiment, there is one pump 110 feeding the systems 119 to 123. Preferably, at the end of each leg prior to the die and sheet or rotary die, there are one or two individual pumps 507 and 509, respectively. Preferably, pump 118 maintains the pressure into the system. This pump 118 is controlled by the main controller (PLC) which is using continuous flow information from the system branch pumps. If the pressure drops, the pump 118 will increase pressure. If the pressure rises, then either the pump 118 slows down or the PET melt material is switched into the bypass chip stream 119. Preferably, if any of the systems are going to have a lower throughput for an extended period of time, such as for several hours, then a flow system value signal will be given to the main pump 110 and reactor 106 to slow the feed to compensate for the lower throughput. Where pumps 507 and 509 include two pumps in series, the first pump of the multiple pump arrays is used to modulate the pressure in the total system. In this arrangement, the first pump in the series of pumps comprising pumps 507 and 509 maintains a constant pressure head into the second pump in the series of pumps. Preferably, the multiple pumps provide highly dependent thickness control with a constant pressure into the die forming units 119 to 123. The first pump will modulate any large swings in pressure. The second pump and each proceeding pump will further reduce any modulation down to less then +/−1 bar leaving the final pump and entering the forming die. This provides for the forming lines (outputs) to remain independent so they can slow down, start, stop, or increase speed independently of the other die forming units. The pressure control loops with the bypass chip stream 119 will provide this function. In one embodiment, the pumps are volumetric pumps as described herein.

The controller controls the continuous reactor 106 whose response time is typically greater in magnitude than that at the output ends of the die forming units 119 to 123 to control the thickness of the final product or sheet. In one embodiment, this is accomplished while having each output leg remain independent of the other output legs. In one embodiment, the control loop provides for sudden process upsets, such as starting or stopping of one of the output legs. In this embodiment, a bypass chip stream 119 allows for the chip production to increase or decrease based on any process upset. The upset can be a planned upset, such as stopping a line for maintenance, etc., or unplanned upset, such as an equipment malfunction.

In addition to the above, the control loop preferably compensates for one leg increasing or decreasing speed while continuing the overall system for making PET sheets 101 in a steady state. The pump 118 and associated valves (not shown) will react by diverting to or from the bypass chip stream 124. This may cause a brief spike or change in pressure that will be reacted to by the pumps 507 and 509 at the end of each system branch. In this embodiment, the individual pumps that comprise the pumps 507, 510 will experience the pressure spike and react to it, while the second pump in the series 509, 511 will experience the modulation of the upset magnitude that will be sufficiently low as to be modulated out in the order of magnitude of less than a second. In another embodiment, each line configuration is different, so individual schemes will apply to that system.

As has been shown, the resulting product or PET sheet is determined by the die forming units 121 to 123. This present system for making PET sheets 101 controls the die forming units 121 to 123 with such precision (as well as an extrusion system) that the objects produced by this system are limited only by the creativity of the manufacturer. Similarly, the number of die forming units can be varied from the three depicted to any number not exceeding the capacity of the reactor 106.

In one embodiment, the present PET reclamation system 100 or system 1110 controls the pressure from a continuous reactor 106 to multiple flow channels. Each channel is tied to a forming section producing different objects. Each flow channel acts as an individual extruder without an extruder. In another embodiment, a single pump may be used if the pump dynamics are accounted for in the process control algorithm.

In one embodiment, the present PET reclamation system 100 or system 1110 impacts favorably the mechanical and optical properties of the PET sheet being manufactured and will enable the PET sheet to be manufactured at a lower caliper when being manufactured for packaging or other applications, such as sheets, strapping, and/or architectural items.

The present PET reclamation system 100 or system 1110 produces PET objects and articles that have quality of trim and the manufacturing process will be of high quality such that it can be blended in high percentages with virgin PET melt without negatively impacting the final sheet quality and the need to increase the caliper.

In addition to the aforementioned aspects and embodiments of the present PET reclamation system 100 or system 1110, the present invention further includes methods for manufacturing these reclaimed PET polymer and products thereof (e.g., sheets 101 or pellets 126).

In one embodiment, a method for reclaiming off spec resin and recycled polyester flake is provided. The method can include: adding off spec resin and/or recycled polyester flake directly into a continuous reactor system; depolymerizing the recycled polyester flake and/or off spec polyester resin in said continuous reactor stream to produce depolymerized product; re-polymerizing the depolymerized product from the depolymerization with virgin reagents (e.g., reagents, monomer(s), catalysts) in the continuous reactor system to produce a new reclaimed polyester resin meeting virgin resin specifications. That is, the reclaimed polyester resin is chemically and/or physically identical to virgin polyester resin. In one aspect, the reacting occurs between 200° C. and about 330° C. In one aspect, a first PET precursor is selected from the group consisting of PTA, Dimethyl Terephthalate (DMT), and IPA. In one aspect, a second PET precursor is selected from the group consisting of MEG, DEG, and PETG. In one aspect, the weight percentage of added flake and off spec resin to first PET precursor and second PET precursor combination is between 1 and 50% of total reactor weight of components in the reactor. However, the reclaimed PET can include 1-50% recycled PET and 50%-99% virgin precursors, or include 1-60% recycled PET and 40%-99% virgin precursors, or include 1-70% recycled PET and 30%-99% virgin precursors, or include 1-80% recycled PET and 20%-99% virgin precursors, or include 1-90% recycled PET and 10%-99% virgin precursors, or include 1-99% recycled PET and 1%-99% virgin precursors, or any range therebetween. In one aspect, the reclaimed PET can include 1-40% recycled PET and 60%-99% virgin precursors, or include 1-30% recycled PET and 70%-99% virgin precursors, or include 1-20% recycled PET and 80%-99% virgin precursors, or include 1-10% recycled PET and 90%-99% virgin precursors, or include 1-5% recycled PET and 95%-99% virgin precursors, or include 1-2% recycled PET and 98%-99% virgin precursors, or any range therebetween The method can obtain reclaimed polyester resin (e.g., PAT, such as PET), which can be provided as the polymer melt, such as PET melt. While PET melt is described herein, it should be recognized that any PAT may be used in place of or with the PET as described herein.

In one embodiment, the method can include providing said PAT melt from one of said multiple outlets to form: a chip stream for forming pellets; a polyester sheet; or a polyester product, such as a PAT product. In one embodiment, the method can include providing said PAT melt from one of said multiple outlets to a suitable mixing device, including a compounder or a kneader, to add additives.

In one embodiment, the method can include controlling individually the mass flow of the PAT melt, which can include controlling the pressure of the PAT melt with pressure control loops prior to forming any PAT objects.

The method can include controlling an outlet pump, the outlet pump directly controlling the flow in the system.

In one embodiment, non-dried, off-specification polyester resin pellets or powder are added to the reactor and reclaimed into new polyester resin.

In one embodiment, post-industrial flake and cleaned-and-washed, post-consumer flake are added to the reactor and reclaimed into new polyester resin.

In one embodiment, the preferred output of the polyester reclamation process is new polyester resin pellets, sheets, or other products.

Figure 4A:
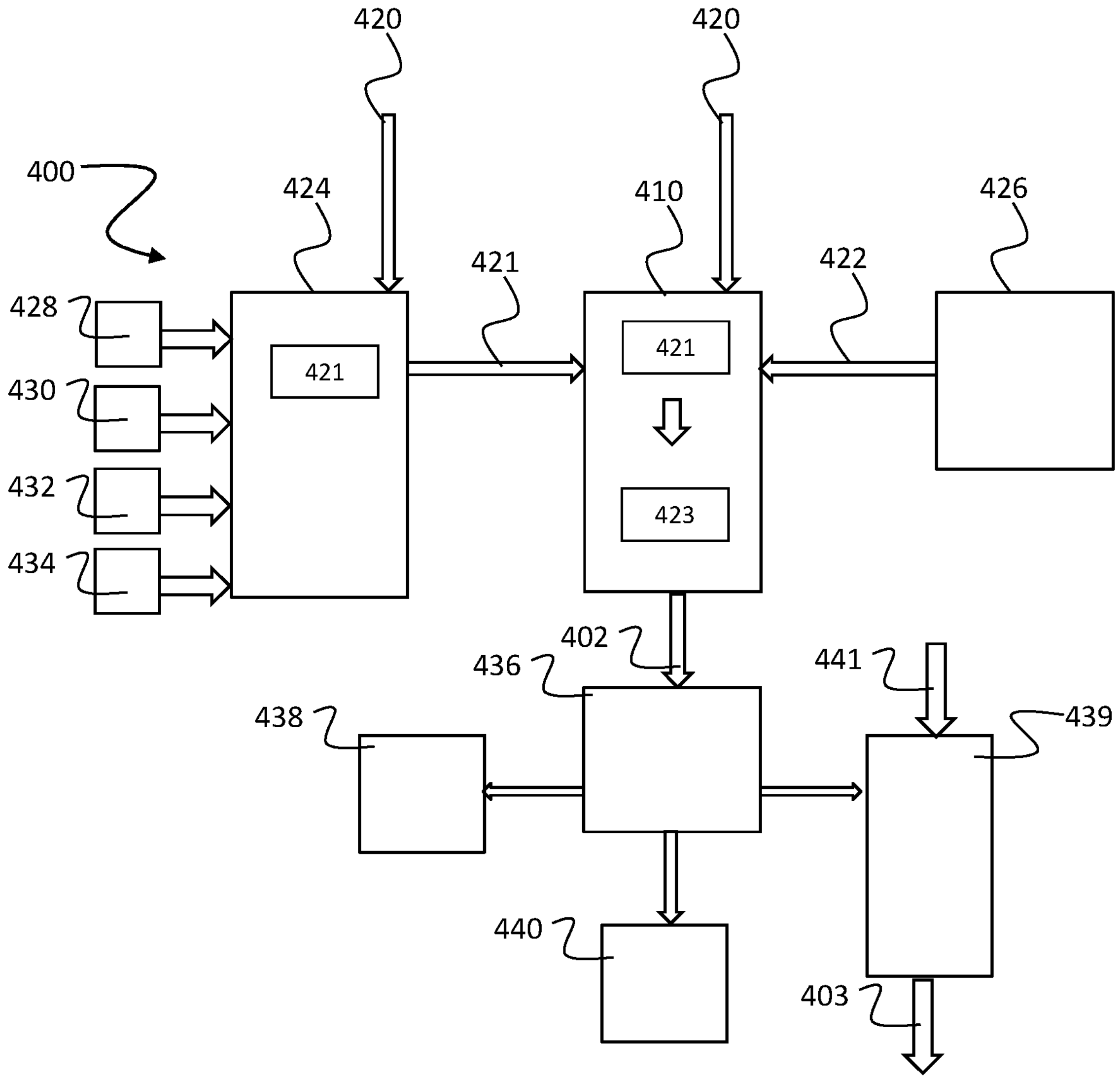
FIG. 4A illustrates a method and system for reclaiming polyester.

FIG. 4A illustrates a method for reclaiming polyester. The method can include: providing a feed of recycled polyester 420; providing a feed of polyester precursors 422; depolymerizing the recycled polyester 420 to obtain depolymerized polyester monomers 421; polymerizing the depolymerized polyester monomers 421 with the polyester precursors 422 to form a reclaimed polyester 423; and providing the reclaimed polyester 423 as output 402. In one aspect, the recycled polyester feed 420 is depolymerized in a de-polymerization reaction vessel 424, and/or the recycled polyester feed 420 is depolymerized from a polymerization reaction vessel 410. In one aspect, the de-polymerization reaction vessel 424 and/or polymerization reaction vessel 410 receives one or more of: water 428; methanol 430; acid or base 432; or ethylene glycol 434. In one aspect, the water 428 de-polymerizes the recycled polyester 420 to produce terephthalic acid and ethylene glycol; the methanol 430 de-polymerizes the recycled polyester 420 to produce dimethyl terephthalate and ethylene glycol; the acid or base 432 is in aqueous form and de-polymerizes the recycled polyester 420 to produce terephthalic acid and ethylene glycol; or the ethylene glycol 434 de-polymerizes the recycled polyester 420 to produce bis-hydroxyethyl terephthalate (BHET). In one aspect, the feed of polyester 420 includes polyester particles or other form of polyester in a flowable format. In one aspect, the feed of polyester 420 includes PAT. In one aspect, the feed of polyester 420 includes PET.

In one embodiment, the de-polymerization reaction vessel 424 and/or polymerization reaction vessel 410 is any batch or continuous reaction vessel, which may be configured as a mixer capable of mixing liquid polyester in batch or continuous formats, such as a single-screw mixer, double-screw mixer, continuous kneader, reciprocating-screw mixer, twin-screw extruder, continuous-plow mixer, or the like. In one aspect, the de-polymerization reaction vessel 424 and polymerization reaction vessel 410 are a single continuous reactor vessel. In one aspect, the de-polymerization reaction vessel 424 and polymerization reaction vessel 410 are two stages of a continuous process. In one aspect, the de-polymerization reaction vessel 424 and/or polymerization reaction vessel 410 also perform one or more of: degassing, homogenizing, dispersing, or heating.

In one embodiment, the method includes providing the reclaimed polyester 423 output 402 to an output system 436. In one aspect, the output system 436 provides the reclaimed polyester 423 to storage 438, a polyester product formation system 439, or an analytical system 440. In one aspect, the analytical system 440 includes one or more analytical systems capable of: determining intrinsic viscosity of reclaimed polyester 423; determining flow rate of reclaimed polyester 423; determining melting point of reclaimed polyester 423; determining crystallization temperature of reclaimed polyester 423; determining a differential scanning calorimetry profile of reclaimed polyester 423; or determining heat distortion temperature of reclaimed polyester 423. In one aspect, the polyester product formation system 439 is configured to: form a product 403 from only the reclaimed polyester 423; or combine the reclaimed polyester 423 with a second feed of polyester 441 (second PAT feed) to produce a product 403 of a polyester alloy.

Figure 4B:
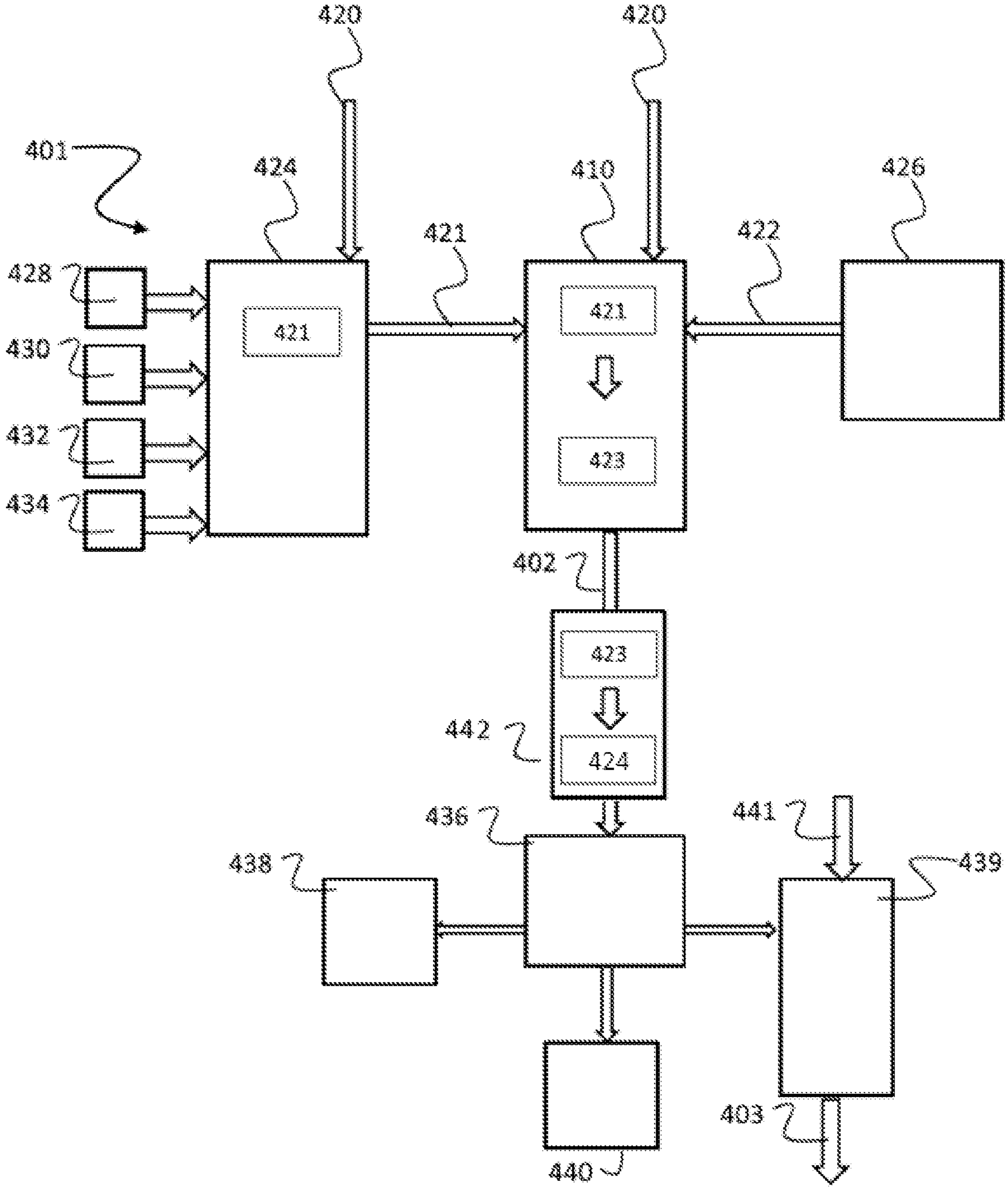
FIG. 4B illustrates a method and system, including a mixing device for adding additives, for reclaiming polyester.

As show in FIG. 4B and illustrated with system 401, in one embodiment, the method includes providing the reclaimed polyester 423 output 402 to a mixing device, for example a kneader or compounder, where additive can be added to the reclaimed polyester to form additive-containing reclaimed polyester 424. From the mixing device, the additive-containing reclaimed polyester 424 is transferred to output system 436. From output system 436, the reclaimed polyester 424 is transferred to storage 438, polyester product formation system 439, or analytical system 440.

In one aspect, the feed of recycled polyester 420 is devoid of another polymer; and/or the polyester precursors 422 is devoid of another polymer or polymer precursor. In one aspect, the feed of recycled polyester 420 consists essentially (or consists of) PAT; and/or the polyester precursors 422 consists essentially (or consists of) PAT precursors. In one aspect, the feed of recycled polyester 420 consists essentially (or consists of) PET; and/or the polyester precursors 422 consists essentially (or consists of) PET precursors. In one aspect, the recycled polyester 420 includes recycled PET flake or off spec resin. In one aspect, the feed of recycled polyester 420 includes water at an amount less than 5%, less than 1%, less than 0.1%, at a trace amount of water, or is devoid of water. In some aspects, the recycled PET flake or off spec PET resin consists essentially of (or consists of or includes) 0-100% PET. In some aspects, the recycled PET flake or off spec PET resin consists essentially of (or consists of or includes) 0-10%, 0-20%, 0-30%, 0-40%, 0-50%, 0-60%, 0-70%, 0-80%, 0-90%, or 0-100% PET. In some aspects, the feed of recycled polyester 420 consists essentially of (or consists of or includes) 0-100% PET. In some aspects, the feed of recycled polyester 420 consists essentially of (or consists of or includes) 0-10%, 0-20%, 0-30%, 0-40%, 0-50%, 0-60%, 0-70%, 0-80%, 0-90%, or 0-100% PET.

In one embodiment, the method includes: depolymerizing the recycled polyester 420 before mixing with the polyester precursors 422; or depolymerizing the recycled polyester 420 during or after mixing with the polyester precursors 422.

In one embodiment, the method includes polymerizing the depolymerized polyester monomers 421 with the polyester precursors 422 to form a reclaimed polyester 423 from polymerizable reagents that polymerize to form PET. In one aspect, the polymerization reaction vessel 410 receives the polyester precursors 422 from precursor storage 426, each precursor being stored separately or in any un-reacting combination.

In one embodiment, the polyester precursors 422 include first precursors that react with second precursors to form polyester. In one aspect, the polyester precursors 422 comprise PET precursors that include: (1) a first PET precursor including a PTA and/or DMT; and (2) a second PET precursor including a MEG and/or DEG. In one aspect, the polyester precursors 422 include CHDM and the product is glycolized polyester. In one aspect, the polyester precursors 422 include IPA.

In one embodiment, the first precursor is provided separately from the second precursor. In one aspect, the first precursor is mixed with the second precursor under non-polymerizing conditions. In one aspect, the first precursor is mixed with the second precursor to form a precursor mixture, and the recycled polyester 420 is mixed into the precursor mixture. In one aspect, the first precursor is mixed with the second precursor to form a precursor mixture, and the recycled polyester 420 and/or depolymerized polyester monomers 421 are mixed into the precursor mixture. In one aspect, the first precursor is mixed with the second precursor to form a precursor mixture, and the depolymerized polyester monomers 421 are mixed into the precursor mixture.

In one embodiment, the method includes: mixing the first precursor with the second precursor to form a precursor mixture; and mixing the recycled polyester 420 into the precursor mixture to form a depolymerization mixture; and performing the depolymerization with the depolymerization mixture.

In one embodiment, the method includes: mixing the first precursor with the second precursor to form a precursor mixture; and mixing the depolymerized polyester monomers 421 into the precursor mixture to form a polymerization mixture; and performing the polymerization with the polymerization mixture.

In one embodiment, the method includes: performing the depolymerization with the recycled polyester 420 before being mixed with the first precursor and second precursor.

In one embodiment, the method includes: performing a first depolymerization; performing a first polymerization; performing a second depolymerization; performing a second polymerization; repeating a depolymerization-polymerization cycle for n cycles, wherein n is an integer. In one aspect, the depolymerization is conducted at a lower temperature than the polymerization, wherein the polymerization is conducted at a temperature where a depolymerizing agent vaporizes from the polymerizing composition.

In one embodiment, the method includes: introducing the recycled polyester 420 into a continuous reactor stream (e.g., 410); depolymerizing the recycled polyester 420 in the continuous reactor stream; polymerizing the depolymerized polyester monomers 420 with the polyester precursors 422 in the continuous reactor stream.

In one embodiment, the polymerizing occurs between 200° C. and about 330° C.

In one embodiment, the polyester precursors 422 comprise precursors that include: (1) a first precursor including a PTA and/or DMT and/or IPA; and (2) a second PET precursor including a MEG and/or DEG and/or PETG.

In one embodiment, the recycled polyester has a weight percentage of between 1 and 50% of total polymerizing composition weight of the reclaimed polyester 423.

In one embodiment, the method further includes outputting the reclaimed polyester 423 as: a chip stream for forming pellets; and/or a polyester sheet.

In one embodiment, the method includes controlling at least one output 402 mass flow by controlling the pressure of a reclaimed polyester 423 melt with pressure control loops prior to said forming a product. In one aspect, the controlling is in a die flowing system that includes the use of an outlet pump, the outlet pump directly controlling the flow in the die flowing system.

In one embodiment, the recycled polyester includes non-dried, off-specification polyester resin pellets and/or powder. In one aspect, the recycled polyester includes post-industrial flake, cleaned and/or washed post-consumer flake.

FIG. 4A also shows a system 400 for reclaiming polyester that includes: a feed of recycled polyester 420; a feed of polyester precursors 422; a reactor configured for: depolymerizing the recycled polyester 420 to obtain depolymerized polyester monomers 421; and/or polymerizing the depolymerized polyester monomers 421 with the polyester precursors 422 to form a reclaimed polyester 423; and an output 402 reclaimed polyester 423. In one aspect, the reactor is: a de-polymerization reaction vessel having the recycled polyester feed 420; and/or a polymerization reaction vessel 410 having the recycled polyester feed 420. In one aspect, the de-polymerization reaction vessel 424 and/or polymerization reaction vessel 410 is operably coupled to a supply of one or more of: water 428; methanol 430; acid or base 432; or ethylene glycol 434. In one aspect, the feed of polyester 420 includes polyester particles or other forms of polyester in a flowable format. In one aspect, the feed of polyester 420 includes PAT. In one aspect, the feed of polyester 420 includes PET. In one embodiment, the reactor, such as the de-polymerization reaction vessel 424 and/or polymerization reaction vessel 410, is any batch or continuous reaction vessel, which may be configured as a mixer capable of mixing liquid polyester in batch or continuous formats, such as a single-screw mixer, double-screw mixer, continuous kneader, reciprocating-screw mixer, twin-screw extruder, continuous-plow mixer, or the like. In one aspect, the reactor is configured to perform one or more of: degassing, homogenizing, dispersing, or heating.

In one embodiment, the system 400 includes an output system 436. In one aspect, the output system 436 is configured to provide the reclaimed polyester 423 to storage 438 or a polyester product formation system 439 or an analytical system 440, by being operably coupled therewith. In one aspect, the polyester product formation system 439 is configured to: form a product 403 from only the reclaimed polyester 423; or combine the reclaimed polyester 423 with a second feed of polyester 441 (second PAT feed) to produce a product 403 of a polyester alloy.

Figure 6:
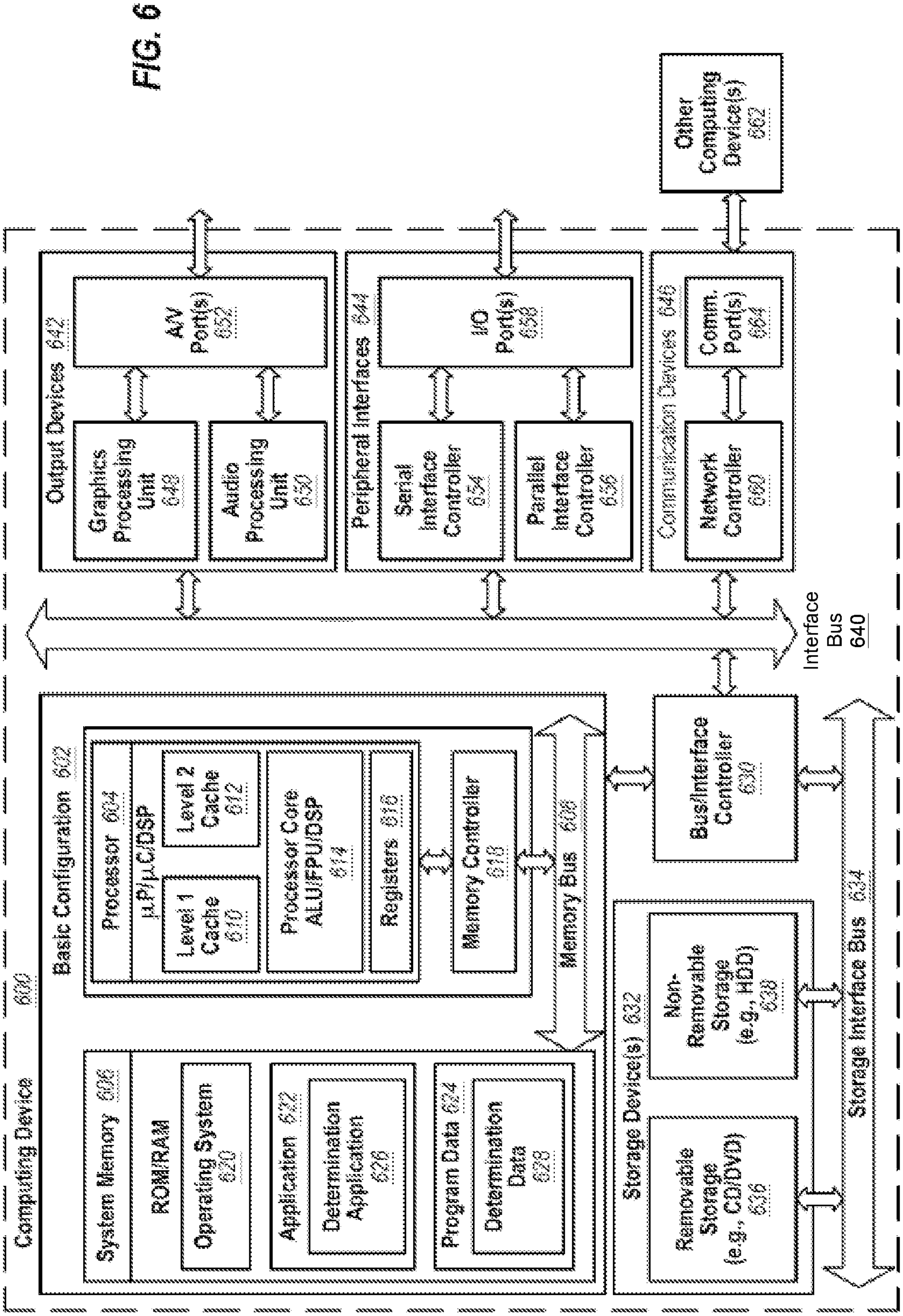
FIG. 6 shows an example computing device that may be arranged in some embodiments to cause performance of the methods (or portions thereof) described herein, such as by being the controller.

In one embodiment, the system 400 can include a controller having a tangible non-transitory memory device having computer executable instructions for controlling the system to perform the method of at least one of the embodiments described herein. The controller can be a computer, such as a computing system 600 as shown in FIG. 6. The controller can be configured for controlling: depolymerizing the recycled polyester 420 before mixing with the polyester precursors 422; and/or depolymerizing the recycled polyester 420 during or after mixing with the polyester precursors 422. In one aspect, the controller is configured for controlling the polymerizing of the depolymerized polyester monomers 421 with the polyester precursors 422 to form a reclaimed polyester 423 from polymerizable reagents that polymerize to form PET. In one aspect, the controller is configured for controlling the polymerization reaction vessel 410 to receive the polyester precursors 422 from a precursor storage 426, each precursor being stored separately or in any un-reacting combination. In one aspect, the controller is configured for controlling: mixing the first precursor with the second precursor to form a precursor mixture; and mixing the recycled polyester 420 into the precursor mixture to form a depolymerization mixture; and performing the depolymerization with the depolymerization mixture. In one aspect, the controller is configured for controlling: mixing the first precursor with the second precursor to form a precursor mixture; and mixing the depolymerized polyester monomers 421 into the precursor mixture to form a polymerization mixture; and performing the polymerization with the polymerization mixture. In one aspect, the controller is configured for: performing the depolymerization with the recycled polyester 420 before being mixed with the first precursor and second precursor.

For the recited methods and other processes and methods disclosed herein, the operations performed in the processes and methods may be implemented in differing orders. Furthermore, the outlined operations are only provided as examples, and some operations may be optional, combined into fewer operations, eliminated, supplemented with further operations, or expanded into additional operations without detracting from the essence of the disclosed embodiments.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

In one embodiment, the present methods can include aspects performed on a computing system, such as the processing and control with the controller. As such, the computing system can include a memory device that has the computer-executable instructions for performing the methods. The computer-executable instructions can be part of a computer program product that includes one or more algorithms for performing any of the methods of any of the claims.

In one embodiment, any of the operations, processes, or methods described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, network elements, and/or any other computing device. The computer-readable medium is not transitory. The computer-readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and the preferred vehicle may vary with the context in which the processes, systems, and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, writing the code for the software, and/or writing the code for the firmware are possible in light of this disclosure. In addition, the mechanisms of the subject matter described herein are capable of being distributed as a program product in a variety of forms, and an illustrative embodiment of the subject matter described herein applies regardless of the particular type of signal-bearing medium used to actually carry out the distribution. Examples of a physical signal-bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission. Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components, wirelessly interactable and/or wirelessly interacting components, and/or logically interacting and/or logically interactable components.

FIG. 6 shows an example computing device 600 (e.g., a computer used as the controller) that may be arranged in some embodiments to perform the methods (or portions thereof) described herein such as being the controller. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (μP), a microcontroller (μC), a digital signal processor (DSP), or any combination thereof. Processor 604 may include one or more levels of caching, such as a level one cache 610, a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. Application 622 may include a determination application 626 that is arranged to perform the operations as described herein, including those described with respect to methods described herein. The determination application 626 can obtain data, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

In some embodiments, it is provided a reclaimed polyester 423 produced by the method for reclaiming polyester according to one or any of the embodiments disclosed herein.

In some embodiments, it is provided a method for making polyester objects comprising:

- providing a polyester melt, wherein the polyester is a reclaimed polyester 423 according to any one of the embodiments disclosed herein;
- flowing the polyester melt to a valve having multiple outlets;
- flowing the polyester melt from the valve having multiple outlets to a die forming system, the die forming system including a plurality of dies, and a chip system; and
- forming the polyester objects from the polyester melt.

In some embodiments, it is provided a method for making polyester objects comprising:

- providing a polyester melt, wherein the polyester is a reclaimed polyester 423 according to any one of the embodiments disclosed herein;
- flowing the polyester melt to a valve having multiple outlets;
- flowing the polyester melt from the valve having multiple outlets to a mixing device, for example a compounder or kneader, to add additives, including, but not limited to inorganic or organic fillers, solid masterbatches, and/or liquid additives; and
- forming the polyester objects from the polyester melt.

In some embodiments, the method for making polyester objects further comprises:

- controlling individually a mass flow of the polyester melt in each of the die forming system and chip system with a combination feedback and feed forward control system on the die forming system and chip system, wherein the combination feedback and feed forward control systems include a first pump proximate to each die of the plurality of dies and a second pump located up stream of the valve, the first and second pumps are controlled by continuous feedback of a calculated flow needed to maintain pressure in each die of the plurality of dies of the die forming system and chip forming system; or
- controlling individually a mass flow of the polyester melt in each of the die forming system and chip system with a combination feedback and feed forward control system on the die forming system and chip system, wherein the die forming system includes a plurality of flow, pressure, and speed indicators and controllers, a primary sheet line pump, and an outlet pump, the outlet pump located at a die of the die forming system, a speed of the primary sheet pump controlled by a feedback loop including an inlet pressure at the outlet pump, the inlet pressure determined by a first indicator of the plurality of flow, pressure, and speed indicators and controllers.

In some embodiments, the method for making polyester objects further comprises filtering the polyester melt prior to the forming the polyester objects. In some embodiments, the method for making polyester objects further comprises filtering the polyester melt prior to the addition of additives and the forming of the polyester objects.

In some embodiments, in the method for making polyester objects, the polyester objects are polyester sheets or pellets.

In some embodiments, the method for making polyester objects further comprises flowing the polyester melt from one of the multiple outlets to a chip stream for forming pellets.

In some embodiments of the method for making polyester objects, the forming polyester objects further comprises adding at least one side extruder to produce multi-layered polyester sheets.

In some embodiments of the method for making polyester objects, the controlling individually the mass flow of the polyester melt comprises controlling the pressure of the polyester melt with pressure control loops prior to the forming the polyester objects.

In some embodiments of the method for making polyester objects, the controlling individually in the die forming system includes the use of an outlet pump, the outlet pump directly controlling the flow in the die flowing system.

In some embodiments, it is provided polyester objects made by the method for making polyester objects in one or any of the embodiments disclosed herein.

EXAMPLES

Various studies were conducted under the embodiments of reclaiming PET.

Example 1

| PET Reclamation | |
|---|---|
| Feeding system | Rotary feeder |
| Dossing capacity | 400 to 2500 kg/h |
| Resin dosed (MT - metric tons) | 10714.7 |
| Flakes dosed (MT) | 230.0 |
| Total reprocessing (MT) | 10944.6 |
| % Reprocessed | 2 to 15% |
| Type of reprocessing trials completed | Resin: 10714.6 MT (off spec)<br>Si coated flakes: 229.9 MT |

Example 2

| PET Reclamation | Reactor S2 |
|---|---|
| Feeding system | Rotary feeder |
| Dossing capacity | 400 to 2500 kg/h |
| Resin dosed (MT) | 13000.1 |
| Flakes dosed (MT) | 393.8 |
| Total reprocessing (MT) | 13393.9 |
| % Reprocessed | 2 to 15% |
| Type of reprocessing trials completed | Resin: 13000 MT (off Spec)<br>Si coated flakes: 177.4 MT<br>Compacted material: 59 MT<br>Proslip coated flakes: 6 MT<br>Flakes uncoated (DPET flakes) 99 MT<br>Flakes uncoated: 51.6 MT (non DEPET)<br>Washed flakes (US washed): 16.5 MT |

Non DPET Flakes had impact modifiers shifted color and haze lightly. (Still in spec)

Example 3

| PET Reclamation | Reactor P1 |
|---|---|
| Feeding system | Rotary feeder |
| Dossing capacity | 600 to 6000 kg/h |
| Resin dosed (MT) | 10321.8 |
| Flakes dosed (MT) | 101.1 |
| Total reprocessing (MT) | 10422.9 |
| % Reprocessed | 2 to 20% |
| Type of reprocessing trials completed | Resin: 10321.8 MT<br>Si coated flakes: 101.1 MT |

Color value, b, shifted. Shift believed to be result of test conditions used to process new resin. Shift still in spec.

Example 4

| PET Reclamation | Reactor P2 |
|---|---|
| Feeding system | Vacuum suction |
| Dossing capacity | 400 to 2000 kg/h |
| Resin dosed (MT) | 1802.3 |
| Flakes dosed (MT) | 0.00 |
| Total reprocessing (MT) | 1802.3 |
| % Reprocessed | 1.3 to 6.6% |
| Type of reprocessing trials completed | Resin: 1802.3 MT |

Figure 7:
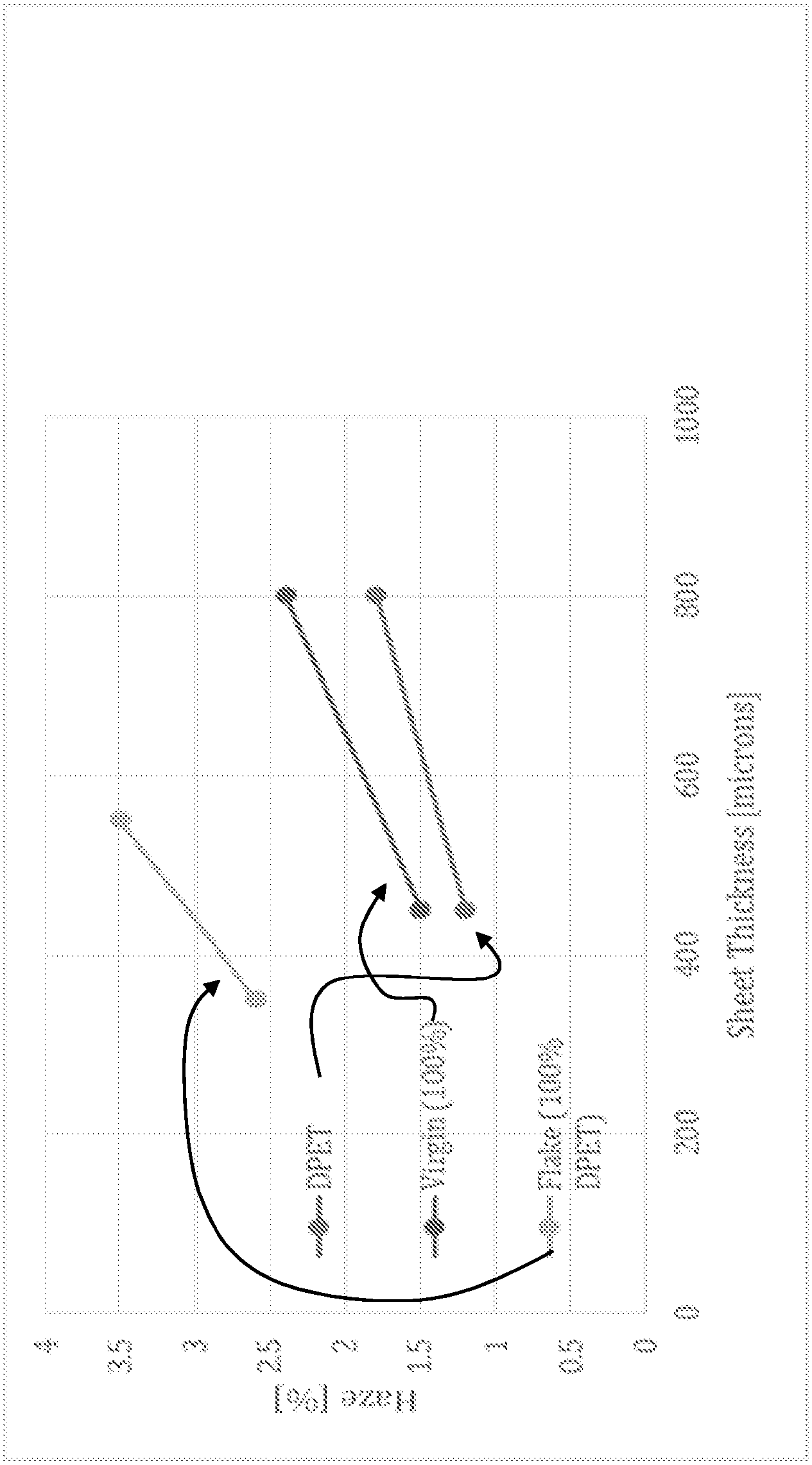
FIG. 7 shows a graph of haze versus PET sheet thickness.

The results from the PET reclamation process of the examples show that resultant reclaimed PET is comparable to product extruded from normal virgin PET resin. These results are superior to normal recycled resin properties. As shown in FIG. 7, based on the results of these experiments, sheets extruded from the original PET resin (DPET) show haze values comparable to virgin PET resin (Virgin) performance, but well below the common recycled PET material characteristics, such as Flake.

The embodiments described herein may include the use of a special-purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

CROSS-REFERENCE

This patent application cross-references: U.S. Pat. Nos. 9,011,737; 8,986,587; 8,545,205; and 7,931,842; and US 2013/0126543; US 2012/0181715; US 2009/0212457; US 2009/0026641; and US 2007/0063374, which references are incorporated herein by specific reference in their entirety.

The invention claimed is:

1. A method for forming additive-containing reclaimed polyester in a continuous process, wherein the method comprises the following steps:

(a) providing a feed of recycled polyester upstream of a de-polymerization reaction vessel and/or a polymerization reaction vessel, wherein the feed of recycled polyester includes polyester particles, off spec polyester flake, off spec polyester resin, or other form of polyester particles, flakes, or resin;

(b) providing a PET depolymerizer upstream of the depolymerization reaction vessel and/or the polymerization reaction vessel, wherein the PET depolymerizer is one or more selected from the group consisting of water, acidic water, alkaline water, methanol, aqueous methanol, ethylene glycol, and aqueous ethylene glycol; and allowing the PET depolymerizer to intermingle with the feed of recycled polyester, thereby depolymerizing the recycled polyester feed via glycolysis, methanolysis, or hydrolysis to obtain depolymerized polyester monomers;

(c) providing a feed of polyester precursors upstream of the polymerization reaction vessel such that the feed of polyester precursors intermingles with the depolymerized polyester monomers; and removing the PET depolymerizer from the polymerization reaction vessel subsequent to depolymerization of the recycled polyester and prior to polymerization in the continuous process;

(d) polymerizing the depolymerized polyester monomers and the polyester precursors to form reclaimed polyester; and (e) continuously and directly transferring the reclaimed polyester to a mixing device wherein at least one additive is added to the reclaimed polyester to form additive-containing reclaimed polyester; and wherein the recycled polyester feed is depolymerized in the de-polymerization reaction vessel, and the recycled polyester feed is depolymerized from the polymerization reaction vessel;

wherein the reclaimed polyester prior to step (e) is characterized as virgin polyester or is indistinguishable from virgin polyester.

2. The method of claim 1, wherein the mixing device is a kneader or compounder.

3. The method of claim 1, wherein the at least one additive is selected from an organic filler, an inorganic filler, a viscosity enhancer, a liquid additive, and/or a solid masterbatch.

4. The method of claim 3, wherein the inorganic filler is selected from the group consisting of calcium carbonate, kaolin (hydrous aluminum silicate), alumina trihydrate, calcium sulfate, and talc.

5. The method of claim 1, wherein the at least one additive is a solid masterbatch.

6. The method of claim 1, wherein the at least one additive is a liquid additive.

7. The method of claim 1, wherein one or more of:

(a) the de-polymerization reaction vessel and/or polymerization reaction vessel receives one or more PET depolymerizers selected from:

(1) water;

(2) methanol;

(3) acid or base; and (4) ethylene glycol;

(b) one or more of:

(1) the PET depolymerizer is water and the water de-polymerizes the recycled polyester to produce terephthalic acid and ethylene glycol;

(2) the PET depolymerizer is methanol and the methanol de-polymerizes the recycled polyester to produce dimethyl terephthalate and ethylene glycol;

(3) the PET depolymerizer is acid and the acid or base is in aqueous form and de-polymerizes the recycled polyester to produce terephthalic acid and ethylene glycol; or (4) the PET depolymerizer is ethylene glycol and the ethylene glycol de-polymerizes the recycled polyester to produce bis-hydroxyethyl terephthalate (BHET).

8. The method of claim 1, wherein:

the feed of recycled polyester includes PAT; and the feed of recycled polyester includes PET, in the amount of 0-10%, 0-20%, 0-30%, 0-40%, 0-50%, 0-60%, 0-70%, 0-80%, 0-90%, or 0-100%.

9. The method of claim 7, wherein:

the de-polymerization reaction vessel and/or polymerization reaction vessel is any continuous reaction vessel, which may be configured as a mixer capable of mixing liquid polyester in continuous formats, a single screw mixer, double-screw mixer, continuous kneader, reciprocating screw mixer, twin-screw extruder, or continuous plow mixer; and the de-polymerization reaction vessel and/or polymerization reaction vessel also performs one or more of: degassing, homogenizing, dispersing, or heating.

10. The method of claim 1, wherein the method further comprises step (f):

providing the additive-containing reclaimed polyester as output to an output system; and wherein:

the output system provides the additive-containing reclaimed polyester to storage or a polyester product formation system or an analytical system; and the analytical system includes one or more analytical systems capable of:

determining the intrinsic viscosity of the additive-containing reclaimed polyester;

determining flow rate of the additive-containing reclaimed polyester;

determining melting point of the additive-containing reclaimed polyester;

determining crystallization temperature of the additive-containing reclaimed polyester;

determining a differential scanning calorimetry profile of the additive-containing reclaimed polyester; or determining heat distortion temperature of the additive-containing reclaimed polyester.

11. The method of claim 1, the method further comprises step (f):

providing the additive-containing reclaimed polyester as output to an output system; and wherein:

the output system provides the additive-containing reclaimed polyester to storage or a polyester product formation system or an analytical system; and the polyester product formation system is configured to one or more of:

form a product from only the additive-containing reclaimed polyester; or combine the additive-containing reclaimed polyester with a second feed of polyester (second PAT feed) to produce a product of a polyester alloy.

12. The method of claim 1, wherein at least one of:

(a) one or more of:

(1) the feed of recycled polyester is devoid of another polymer; or (2) the polyester precursors is devoid of another polymer;

(b) one or more of:

(1) the feed of recycled polyester consists essentially of PAT;

(2) the feed of recycled polyester consists of PAT;

(3) the polyester precursors consist essentially of PAT precursors; or (4) the polyester precursors consist of PAT precursors;

(c) one or more of:

(1) the feed of recycled polyester consists essentially of PET;

(2) the feed of recycled polyester consists of PET;

(3) the polyester precursors consist essentially of PET precursors; or (4) the polyester precursors consists of PET precursors;

(d) the recycled polyester includes recycled PET flake or off spec PET resin, the recycled PET flake or off spec PET resin includes PET in the amount of 0-10%, 0-20%, 0-30%, 0-40%, 0-50%, 0-60%, 0-70%, 0-80%, 0-90%, or 0-100%;

(e) the feed of recycled polyester includes water at an amount less than 5%, less than 1%, less than 0.1%, at a trace amount of water, or is devoid of water; or (f) the polymerization reaction vessel receives the polyester precursors from precursor storage, each precursor being stored separately or in any un-reacting combination.

13. The method of claim 1, wherein the method comprises one or more of:

depolymerizing the recycled polyester before mixing with the polyester precursors; and depolymerizing the recycled polyester during or after mixing with the polyester precursors; and polymerizing the depolymerized polyester monomers with the polyester precursors to form a reclaimed polyester from polymerizable reagents that polymerize to form PET.

14. The method of claim 1, wherein one or more of:

the polymerizing further comprises polymerizing the depolymerized polyester monomers with the polyester precursors to form the reclaimed polyester from polymerizable reagents that polymerize to form PET;

the polyester precursors include first precursors that react with second precursors to form polyester; and one or more of:

the polyester precursors comprise PET precursors that include: (1) a first PET precursor including a PTA and/or DMT; and (2) a second PET precursor including a MEG and/or DEG;

the polyester precursors include Cyclohexanedimethanol and the product is glycolized polyester;

the polyester precursors include IPA;

the first precursors are provided separately from the second precursors;

the first precursors are mixed with the second precursors under non-polymerizing conditions;

the first precursors are mixed with the second precursors to form a precursor mixture, and the recycled polyester is mixed into the precursor mixture;

the first precursors are mixed with the second precursors to form a precursor mixture, and the recycled polyester and/or depolymerized polyester monomers are mixed into the precursor mixture; and the first precursors are mixed with the second precursors to form a precursor mixture, and the depolymerized polyester monomers are mixed into the precursor mixture.

15. The method of claim 1, wherein:

the polymerizing further comprises polymerizing the depolymerized polyester monomers with the polyester precursors to form a reclaimed polyester from polymerizable reagents that polymerize to form PET;

the polyester precursors include first precursors that react with second precursors to form polyester; and the method further comprises at least one of:

(1)

mixing the first precursors with the second precursors to form a precursor mixture;

mixing the recycled polyester into the precursor mixture to form a depolymerization mixture; and performing the depolymerization with the depolymerization mixture;

(2)

mixing the first precursors with the second precursors to form a precursor mixture;

mixing the depolymerized polyester monomers into the precursor mixture to form a polymerization mixture; and performing the polymerization with the polymerization mixture; and (3) performing the depolymerization with the recycled polyester before being mixed with the first precursor and second precursor.

16. The method of claim 1, wherein one or more of:

(a) the depolymerizing further comprises performing a first depolymerization and a second depolymerization;

the polymerizing further comprises performing a first polymerization and a second polymerization; and repeating a depolymerization-polymerization cycle for n cycles, wherein n is an integer;

(b) introducing the recycled polyester upstream of the de-polymerization reaction vessel and/or the polymerization reaction vessel;

depolymerizing the recycled polyester in the de-polymerization reaction vessel and/or the polymerization reaction vessel; and polymerizing the depolymerized polyester monomers with the polyester precursors polymerization reaction vessel;

(c) the polymerizing occurs between about 200° C. and about 330° C.;

(d) the polyester precursors comprise precursors that include: (1) a first precursor including a PTA and/or DMT and/or IPA; and (2) a second PET precursor including a MEG and/or DEG and/or PETG;

(e) the recycled polyester has a weight percentage of between 1 and 50% of total polymerizing composition weight of the reclaimed polyester;

(f) the recycled polyester includes post-industrial flake, cleaned and/or washed post-consumer flake; or (g) the method further comprises outputting the additive-containing reclaimed polyester as:

a chip stream for forming pellets; or a polyester sheet.

17. The method of claim 1, wherein the method further comprising:

controlling at least one output mass flow by controlling the pressure of the additive-containing reclaimed polyester melt with pressure control loops prior to forming a product, wherein the controlling is in a die flowing system that includes the use of an outlet pump, the outlet pump directly controlling the flow in the die flowing system.

18. The method of claim 1, wherein the PET depolymerizer is one or more selected from the group consisting of water, acidic water, alkaline water, methanol, and ethylene glycol.

19. The method of claim 1, wherein the PET depolymerizer is removed by distillation.

* * * * *